US012041654B2

United States Patent
Liu et al.

(10) Patent No.: US 12,041,654 B2
(45) Date of Patent: Jul. 16, 2024

(54) RANDOM ACCESS RESOURCE DETERMINING METHOD, TERMINAL, AND NETWORK DEVICE

(71) Applicant: VIVO MOBILE COMMUNICATION CO., LTD., Dongguan (CN)

(72) Inventors: Siqi Liu, Dongguan (CN); Zichao Ji, Dongguan (CN); Kai Wu, Dongguan (CN); Yu Ding, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 485 days.

(21) Appl. No.: 17/244,901

(22) Filed: Apr. 29, 2021

(65) Prior Publication Data

US 2021/0250991 A1   Aug. 12, 2021

Related U.S. Application Data

(63) Continuation of application No. PCT/CN2019/110761, filed on Oct. 12, 2019.

(30) Foreign Application Priority Data

Nov. 2, 2018 (CN) .......................... 201811303032.3

(51) Int. Cl.
*H04W 24/08* (2009.01)
*H04W 72/044* (2023.01)
*H04W 74/00* (2009.01)
*H04W 74/02* (2009.01)
*H04W 74/0833* (2024.01)

(52) U.S. Cl.
CPC ......... *H04W 74/008* (2013.01); *H04W 24/08* (2013.01); *H04W 72/046* (2013.01); *H04W 74/02* (2013.01); *H04W 74/0833* (2013.01)

(58) Field of Classification Search
CPC ............... H04W 24/08; H04W 72/046; H04W 74/008; H04W 74/02; H04W 74/0833
See application file for complete search history.

(56) References Cited

U.S. PATENT DOCUMENTS

| 10,925,066 B2* | 2/2021 | Davydov ............ H04W 56/001 |
| 2013/0279437 A1* | 10/2013 | Ng ...................... H04L 27/2655 370/329 |
| 2018/0062807 A1* | 3/2018 | Seo ........................ H04W 16/14 |
| 2019/0014587 A1* | 1/2019 | Zhang ................... H04W 72/12 |

(Continued)

FOREIGN PATENT DOCUMENTS

CN       108023841 A       5/2018

OTHER PUBLICATIONS

International Search Report issued in corresponding International Application No. PCT/CN2019/110761, dated Jan. 9, 2020, 4 pages.

(Continued)

*Primary Examiner* — Jean A Gelin
(74) *Attorney, Agent, or Firm* — IPX PLLC

(57) ABSTRACT

The present disclosure discloses a random access resource determining method, a terminal, and a network device thereof. The method applied to a terminal side includes: obtaining a quasi co-location (QCL) reference object that is quasi co-located with a target reference object; and determining an available random access resource based on the target reference object and the QCL reference object.

17 Claims, 3 Drawing Sheets

(56) References Cited

U.S. PATENT DOCUMENTS

| | | | |
|---|---|---|---|
| 2019/0058519 A1* | 2/2019 | Davydov | H04W 72/21 |
| 2019/0075599 A1* | 3/2019 | Xia | H04B 7/0695 |
| 2019/0166513 A1* | 5/2019 | Lin | H04W 24/10 |
| 2019/0229792 A1* | 7/2019 | John Wilson et al. | H04W 72/046 |
| 2019/0261329 A1* | 8/2019 | Park | H04L 5/0048 |
| 2019/0306924 A1* | 10/2019 | Zhang | H04B 7/063 |
| 2019/0379431 A1* | 12/2019 | Park | H04B 7/0408 |
| 2020/0052769 A1* | 2/2020 | Cirik | H04L 1/0026 |
| 2020/0059281 A1* | 2/2020 | Grant | H04B 7/088 |
| 2020/0106498 A1* | 4/2020 | Zhou | H04B 7/0617 |
| 2020/0112359 A1* | 4/2020 | Park | H04L 5/023 |
| 2020/0145082 A1* | 5/2020 | Chen | H04L 5/0023 |
| 2020/0146054 A1* | 5/2020 | Jeon | H04W 74/0833 |
| 2020/0146059 A1* | 5/2020 | Cirik | H04L 5/001 |
| 2020/0267571 A1* | 8/2020 | Park | H04L 5/0051 |
| 2020/0304256 A1* | 9/2020 | Park | H04L 25/03 |
| 2021/0058932 A1* | 2/2021 | Takeda | H04B 7/088 |
| 2021/0083822 A1* | 3/2021 | Jia | H04W 52/367 |
| 2021/0168744 A1* | 6/2021 | Matsumura | H04L 27/2675 |
| 2021/0258062 A1* | 8/2021 | Koskela | H04W 74/02 |
| 2022/0061087 A1* | 2/2022 | Koskela | H04W 72/21 |
| 2023/0217429 A1* | 7/2023 | Faxér | H04L 5/0094 370/329 |

OTHER PUBLICATIONS

VIVO., "Discussion on enhancements to initial access procedure.", 3GPP TSG RAN WG1 #96bis, R1- 1904066., Apr. 12, 2019.

LG Electronics Inc., "Correction on RA resource selection.", 3GPP TSG-RAN WG2 Meeting #103bis, R2-1815457., Oct. 12, 2018.

Huawei, "Summary of remaining issues on CSI-RS.", 3GPP TSG RAN WG1 Meeting #91, R1-1721443., Dec. 1, 2017.

* cited by examiner

Send, to a terminal, parameter information of a reference object group to which a target reference object belongs, where the reference object group further includes: a QCL reference object that is quasi co-located with the target reference object — 61
FIG. 6
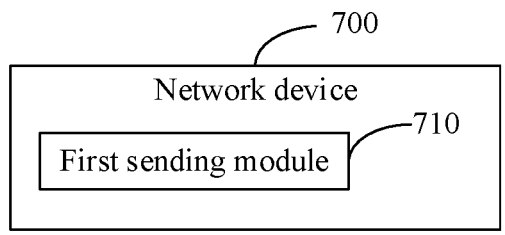
FIG. 7
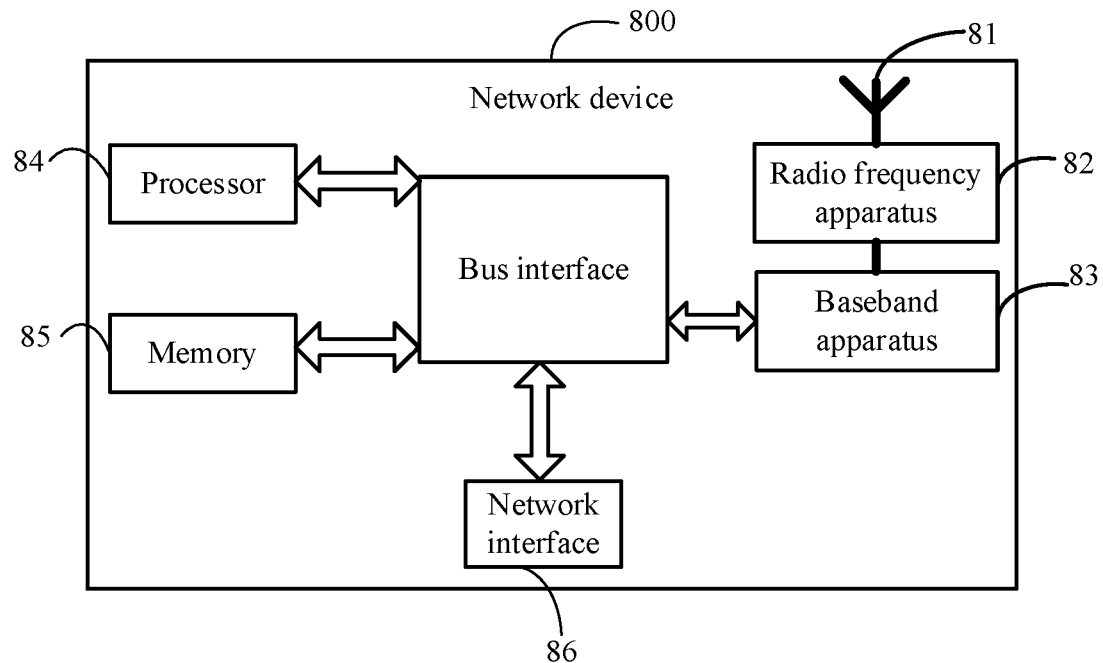
FIG. 8

RANDOM ACCESS RESOURCE DETERMINING METHOD, TERMINAL, AND NETWORK DEVICE

CROSS-REFERENCE TO RELATED APPLICATIONS

This application is a bypass continuation of PCT Application No. PCT/CN2019/110761 filed Oct. 12, 2019, which claims priority to Chinese Patent Application No. 201811303032.3, filed on Nov. 2, 2018 in China, both of which are incorporated herein by reference in their entireties.

TECHNICAL FIELD

The present disclosure relates to the field of communications technologies, and in particular, to a random access resource determining method, a terminal, and a network device.

BACKGROUND

In a mobile communications system, a network device may configure a physical random access channel (PRACH) transmission occasion, or referred to as a PRACH occasion or an RO, for transmitting a preamble. There is an association relationship between an RO and some downlink signals, such as a channel state information reference signal (CSI-RS) and a synchronization signal and PBCH block (SS/PBCH block), or referred to as an SSB. A terminal may select, according to measurement results of these downlink signals or an indication of the network device, an RO associated with a corresponding downlink signal to send a preamble.

In a transmission mechanism of an unlicensed frequency band, available resources for a network device and a terminal are uncertain. Even if the network device configures some downlink signal resources for the terminal, the terminal cannot determine whether the network device has preempted a corresponding resource and successfully performed sending of a downlink signal. As shown in FIG. 1, the network device preempts only two SSB resources in T1, and sends an SSB 1 and an SSB 2; the network device preempts no resource in T2; and the network device preempts four SSB resources in T3, and sends the SSB 1, the SSB 2, an SSB 3, and an SSB 4, where the SSB 1 and the SSB 3 are quasi co-located (quasi Co-location, QCL), and the SSB 2 and the SSB 4 are QCL. The network device indicates that the SSB 1, the SSB 2, the SSB 3, and SSB 4 are sent in total, and constructs an association relationship between an SSB and an RO based on these four SSBs. Assuming that the terminal receives the SSB 1 in T1, if it does not enter T3 before the terminal receives the SSB 1 and attempts to perform random access, the terminal cannot measure the SSB 3, and the terminal can only select an RO based on the SSB 1. The terminal performs a random access procedure on the selected RO. If access cannot be made on the RO corresponding to the SSB 1, there is no other available RO, which may cause failure of the random access procedure.

SUMMARY

Embodiments of the present disclosure provide a random access resource determining method, a terminal, and a network device, to resolve a problem that the terminal can only select an RO based on a measured SSB and cannot select another available RO, which causes failure of a random access procedure.

According to a first aspect, some embodiments of the present disclosure provide a random access resource determining method, applied to a terminal side, including: obtaining a QCL reference object that is quasi co-located with a target reference object; and determining an available random access resource based on the target reference object and the QCL reference object.

According to a second aspect, some embodiments of the present disclosure further provide a terminal, including: a first obtaining module, configured to obtain a QCL reference object that is quasi co-located with a target reference object; and a first determining module, configured to determine an available random access resource based on the target reference object and the QCL reference object.

According to a third aspect, some embodiments of the present disclosure provide a terminal. The terminal includes a processor, a memory, and a computer program stored in the memory and running on the processor. When the computer program is executed by the processor, the steps of the foregoing random access resource determining method are implemented.

According to a fourth aspect, some embodiments of the present disclosure provide a random access resource determining method, applied to a network device side, including: sending, to a terminal, parameter information of a reference object group to which a target reference object belongs, where the reference object group further includes: a QCL reference object that is quasi co-located with the target reference object.

According to a fifth aspect, some embodiments of the present disclosure provide a network device, including: a first sending module, configured to send, to a terminal, parameter information of a reference object group to which a target reference object belongs, where the reference object group further includes: a QCL reference object that is quasi co-located with the target reference object.

According to a sixth aspect, some embodiments of the present disclosure further provide a network device. The network device includes a processor, a memory, and a computer program stored in the memory and running on the processor. When the processor executes the computer program, the steps of the foregoing random access resource determining method are implemented.

According to a seventh aspect, some embodiments of the present disclosure provide a computer-readable storage medium. The computer-readable storage medium stores a computer program, and when the computer program is executed by a processor, the steps of the foregoing random access resource determining method are implemented.

Therefore, according to the embodiments of the present disclosure, a subsequent available random access resource can not only be determined based on the target reference object, but can also be determined based on the QCL reference object that is quasi co-located with the target reference object, thereby increasing available ROs for the terminal, increasing the success rate of a random access procedure, and reducing a random access delay.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and those of ordinary skill in the art can still derive other drawings from these accompanying drawings without creative efforts.

FIG. 6 represents a schematic flowchart of a random access resource determining method on a network device side according to the present disclosure;

FIG. 7 represents a schematic diagram of a modular structure of a network device according to the present disclosure; and FIG. 8 represents a block diagram of a network device according to some embodiments of the present disclosure.

DETAILED DESCRIPTION OF EMBODIMENTS

Figure 1:
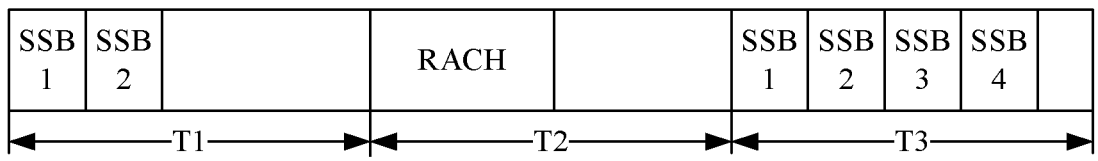
FIG. 1 represents a schematic diagram of resource mapping for SSB transmission by a network device in transmission of an unlicensed frequency band.

Exemplary embodiments of the present disclosure will be described below in further detail with reference to the accompanying drawings. Although the accompanying drawings show exemplary embodiments of the present disclosure, it should be understood that the present disclosure can be implemented in various forms and shall not be limited by embodiments described herein. On the contrary, these embodiments are provided to enable a more thorough understanding of the present disclosure and to fully convey the scope of the present disclosure to those skilled in the art.

Terms "first,", "second", or the like in the description and claims of this application are used to distinguish similar objects, instead of describing a specific sequence or order. It should be understood that the data termed in such a way is interchangeable in proper circumstances so that the embodiments of this application described herein can be implemented in an order other than the order illustrated or described herein. Moreover, the terms "include", "contain" and any variants thereof mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. "And/or" used in the specification and claims means at least one of the connected objects.

The technology described in this specification is not limited to the Long Term Evolution (LTE)/LTE-Advanced (LTE-A) system. It can also be applied in various wireless communication systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA) and other systems. The terms "system" and "network" are often used interchangeably. The technology described herein can be used in the above-mentioned systems and radio technologies as well as other systems and radio technologies. However, an NR system is described in the following description for illustrative purposes, and an NR terminology is used in most of the following description, although these technologies can also be applied to applications other than the NR system application.

The following description provides examples and does not limit the scope, applicability, or configuration set forth in the claims. The functions and arrangements of the elements under discussion may be changed without departing from the spirit and scope of the present disclosure. In various examples, various procedures or components may be omitted, replaced, or added appropriately. For example, the described method may be performed in an order different from that described, and steps may be added, omitted, or combined. In addition, features described with reference to some examples may be combined in other examples.

Figure 2:
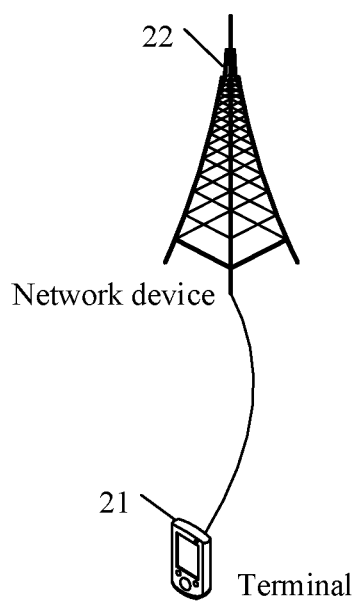
FIG. 2 represents a block diagram of a mobile communications system to which some embodiments of the present disclosure can be applied.

Referring to FIG. 2, FIG. 2 is a block diagram of a wireless communications system applicable to some embodiments of the present disclosure. The wireless communications system includes a terminal 21 and a network device 22. The terminal 21 may also be referred to as a terminal device or user equipment (UE). The terminal 21 may be a terminal side device such as a mobile phone, a tablet personal computer, a laptop computer, a personal digital assistant (PDA), a mobile internet device (MID), a wearable device, or an in-vehicle device. It should be noted that a specific type of the terminal 21 is not limited in the embodiments of the present disclosure. The network device 22 may be a base station or a core network. The base station may be a base station of 5G and later releases (for example, a gNB and a 5G NR NB), or a base station in other communications systems (for example, an eNB, a WLAN access point, or other access points). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a WiFi node, or another appropriate term in the art. Provided that the same technical effects are achieved, the base station is not limited to specific technical vocabulary. It should be noted that in some embodiments of the present disclosure, the base station in the NR system is merely used as an example, but does not limit a specific type of the base station.

The base station can communicate with the terminal 21 under the control of a base station controller. In various examples, the base station controller may be a part of the core network or some base stations. Some base stations can exchange control information or user data with the core network through backhaul. In some examples, some of these base stations can directly or indirectly communicate with each other over a backhaul link, which may be a wired or wireless communication link. The wireless communications system can support operations on a plurality of carriers (waveform signals of different frequencies). A multi-carrier transmitter can simultaneously transmit a modulated signal on the plurality of carriers. For example, each communication link may be a multi-carrier signal modulated based on various radio technologies. Each modulated signal can be sent over different carriers and can carry control information (for example, a reference signal or a control channel), overhead information, data, and the like.

The base station can wirelessly communicate with the terminal 21 via one or more access point antennas. Each base station may provide communication coverage for a corresponding coverage area. A coverage area of an access point may be divided into sectors that form merely a part of the coverage area. The wireless communications system may include different types of base stations (for example, a macro base station, a micro base station, or a pico base station). The base station can also use different radio technologies, such as cellular or WLAN radio access technologies. The base station can be associated with the same or different access networks or operator deployment. Coverage areas of different base stations (including coverage areas of base stations of the same or different types, coverage areas using the same or different radio technologies, or coverage areas belonging to the same or different access networks) may overlap.

A communication link in the wireless communications system may include an uplink for carrying uplink (UL) transmission (for example, from the terminal 21 to the network device 22) or a downlink for carrying downlink (DL) transmission (for example, from the network device 22 to the terminal 21). The UL transmission may also be referred to as reverse link transmission, and the DL transmission may also be referred to as forward link transmission. The downlink transmission may be performed over a licensed frequency band, an unlicensed frequency band, or both. Similarly, the uplink transmission may be performed over a licensed frequency band, an unlicensed frequency band, or both.

Figure 3:
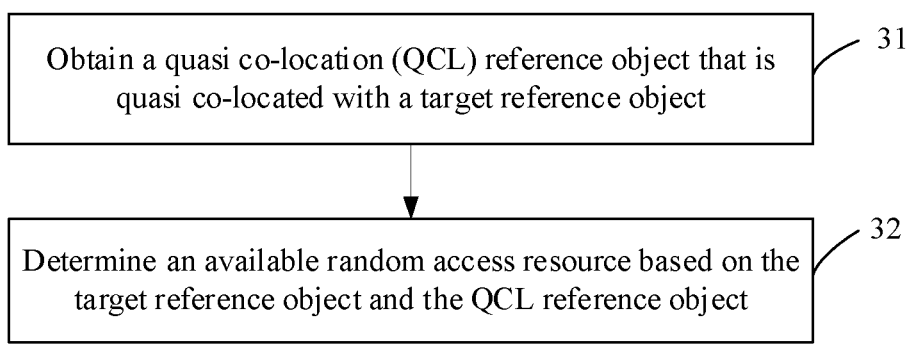
FIG. 3 represents a schematic flowchart of a random access resource determining method on a terminal side according to some embodiments of the present disclosure.

Some embodiments of the present disclosure provide a random access resource determining method, applied to a terminal side. As shown in FIG. 3, the method includes the following steps:

Step 31: Obtain a QCL reference object that is quasi co-located with a target reference object.

A reference object is a downlink signal for determining an available random access resource. The target reference object is a downlink signal determined by a terminal through measurement. The reference object may include but is not limited to an SSB and/or a channel state information reference signal (CSI-RS). Accordingly, the target reference object may also be an SSB and/or a CSI-RS. The QCL reference object is a signal that is quasi co-located with the target reference object, and its type may be an SSB and/or a CSI-RS. It should be noted that signal types of the target reference object and the QCL reference object may be the same or different. For example, when the target reference object is an SSB, the QCL reference object may be an SSB or a CSI-RS. The QCL reference object and the target reference object are in a quasi co-location relationship, and being in the quasi co-location relationship may also be referred to as being in a particular beam relationship (for example, using the same or corresponding beam), or being in a particular spatial relationship (for example, being in the same or overlapping transmission direction), or some spatial domain transmission filter parameters being the same (for example, using the same spatial domain transmission filter), or using the same QCL reference which referred to as a QCL source (for example, having the same QCL source), or at least one QCL parameter or attribute being the same. The QCL parameter or attribute includes at least one of the following: Doppler spread, a Doppler shift, an average gain, an average delay, delay spread, spatial reception (Rx) parameters, or the like. A type of quasi co-location of the QCL reference object and the target reference object may be any one of QCL TypeA, QCL TypeB, QCL TypeC, and QCL TypeD. It should be noted that in some embodiments of the present disclosure, an SSB is basically used as an example of the reference object for description. When the reference object is a CSI-RS or other downlink signal, reference may be made to the corresponding implementations to achieve the desired effects.

Step 32: Determine an available random access resource based on the target reference object and the QCL reference object.

After determining the target reference object and the QCL reference object, the terminal may determine a subsequent (or referred to as following, follow-up, next, or the like) available random access resource (available RO) based on at least one of the target reference object or the QCL reference object. For example, when the terminal obtains a plurality of target reference objects (such as an SSB 1 and an SSB 2) through measurement, the terminal may determine the subsequent available random access resource based on at least one (the SSB 1, or the SSB 2, or the SSB 1 and the SSB 2) of the plurality of target reference objects. For another example, when the terminal obtains one target reference object (such as the SSB 1) through measurement, and obtains one QCL reference object (such as the SSB 3) that is quasi co-located with the target reference object, the terminal may determine the subsequent available random access resource based on the QCL reference object (SSB 3), or the terminal may determine the subsequent available random access resource based on the target reference object and the QCL reference object (the SSB 1 and the SSB 3).

Step 32 in some embodiments of the present disclosure can be implemented in different manners. In some embodiments of the present disclosure, the following manners are merely exemplary descriptions, and other implementations can also be applied to some embodiments of the present disclosure to achieve the desired effects.

Step 32 may be implemented in, for example but not limited to, the following manners:

Manner 1: Determining at least one candidate random access resource in a candidate random access resource set as the available random access resource.

The candidate random access resource set is a candidate set for the subsequent available random access resource, and the set is related to the target reference object and/or the QCL reference object. Specifically, the candidate random access resource set is the union of first candidate random access resources (first ROs for short) corresponding to the target reference object and second candidate random access resources (second ROs for short) corresponding to the QCL reference object. In other words, the terminal may select at least RO in the union of the RO set corresponding to the target reference object and the RO set corresponding to the QCL reference object as the next available RO, that is, the terminal determines the next available RO based on the union of the ROs corresponding to the target reference object and the ROs corresponding to the QCL reference object. Assuming that one target reference object corresponds to four ROs, these four ROs are the first ROs; and assuming that the QCL reference object corresponds to four ROs, these four ROs are the second ROs.

Taking an SSB as an example, the terminal selects at least one RO in the union of ROs corresponding to a target SSB (or referred to as a selected SSB) and ROs are corresponding to a QCL SSB as a next available RO. That is, the terminal determines at least one next available RO based on the union of the ROs corresponding to the selected SSB and the ROs corresponding to the QCL SSB. In other words, the terminal determines the next available RO based on ROs in a PRACH configuration corresponding to the target SSB and ROs in a PRACH configuration corresponding to the QCL SSB. Optionally, when each SSB in a PRACH configuration corresponds to a plurality of discrete or continuous ROs, the terminal determines the next available RO based on a plurality of discrete or continuous ROs in the PRACH configuration corresponding to the target SSB and a plurality of discrete or continuous ROs in the PRACH configuration corresponding to the QCL SSB.

Alternatively, the candidate random access resource set is the intersection of the first candidate random access resources and the second candidate random access resources. In other words, the terminal may select at least RO in the intersection of the RO set corresponding to the target reference object and the RO set corresponding to the QCL reference object as the next available RO, that is, the terminal determines the next available RO based on the intersection of the ROs corresponding to the target reference object and the ROs corresponding to the QCL reference object.

Taking an SSB as an example, the terminal selects at least one RO in the intersection of ROs corresponding to a target SSB (or referred to as a selected SSB) and ROs are corresponding to a QCL SSB as a next available RO. That is, the terminal determines at least one next available RO based on the intersection of the ROs corresponding to the selected SSB and the ROs corresponding to the QCL SSB. In other words, the terminal determines the next available RO based on ROs in a PRACH configuration corresponding to the target SSB and ROs in a PRACH configuration corresponding to the QCL SSB. Optionally, when each SSB in a PRACH configuration corresponds to a plurality of discrete or continuous ROs, the terminal determines the next available RO based on a plurality of discrete or continuous ROs in the PRACH configuration corresponding to the target SSB and a plurality of discrete or continuous ROs in the PRACH configuration corresponding to the QCL SSB.

The first candidate random access resources and the second candidate random access resources may completely overlap, or may not overlap, or may partially overlap. For example, the first candidate random access resources and the second candidate random access resources both include an RO 1, an RO 2, an RO 3, and an RO 4. For another example, the first candidate random access resources include the RO 1 and the RO 2, and a second candidate random access resource includes the RO 3 and the RO 4. For still another example, the first candidate random access resources include the RO 1, the RO 2, and the RO 3, and the second candidate random access resources include the RO 2, the RO 3, and the RO 4.

Further, in this manner, the terminal may determine the subsequent available random access resource in the following manners:

1. Determining at least one candidate random access resource randomly selected (or selected with equal probability, meaning the probability of being selected is equal) in the candidate random access resource set as the available random access resource.

1) When the candidate random access resource set is the union of the first ROs and the second ROs, the terminal may select one RO in the union with equal probability as the next available RO. Alternatively, the terminal may select N (not equal to 1) ROs in the union with equal probability as the next available ROs.

Taking an SSB as an example, the terminal selects one RO in the union of the ROs corresponding to the target SSB and the QCL SSB with equal probability as the next available RO. It is assumed that the target SSB is the SSB 1 and the QCL SSB is the SSB 2. The SSB 1 corresponds to the ROs 1 to 4, and the SSB 2 corresponds to ROs 5 to 8. In addition, the ROs 1 to 4 are frequency division multiplexed (FDM), the ROs 5 to 8 are FDM, and the ROs 1 to 4 and the ROs 5 to 8 have different time domain resources. In this case, the terminal considers that the ROs 1 to 8 are all the candidate random access resources, that is, the ROs 1 to 8 are all available, and the terminal may select one RO from the ROs 1 to 8 with equal probability as the next available RO.

Alternatively, the terminal may select N ROs in the union with equal probability for the target SSB and the QCL SSB, as the next available ROs, where N is greater than 1. It is assumed that N=2, the target SSB is the SSB 1, and the QCL SSB is the SSB 2. The SSB 1 corresponds to the ROs 1 to 4, and the SSB 2 corresponds to ROs 5 to 8. In addition, the ROs 1 to 4 are FDM, the ROs 5 to 8 are FDM, and the ROs 1 to 4 and the ROs 5 to 8 have different time domain resources. In this case, the terminal considers that the ROs 1 to 8 are all available, and the terminal may select four ROs from the ROs 1 to 8 with equal probability as the next available ROs. Alternatively, the terminal may select two ROs from the ROs 1 to 4 with equal probability and two ROs from the ROs 5 to 8 with equal probability, and use the four ROs as the next available ROs.

2) When the candidate random access resource set is the intersection of the first ROs and the second ROs, the terminal may select one RO in the intersection with equal probability as the next available RO. Alternatively, the terminal may select N (greater than 1) ROs in the intersection with equal probability as the next available ROs.

Taking an SSB as an example, the terminal selects one RO in the intersection of the ROs corresponding to the target SSB and the QCL SSB with equal probability as the next available RO. It is assumed that the target SSB is the SSB 1 and the QCL SSB is the SSB 2. The SSB 1 corresponds to the ROs 1 to 8, and the SSB 2 corresponds to the ROs 1 to 8. In addition, the ROs 1 to 4 are FDM, the ROs 5 to 8 are FDM, and the ROs 1 to 4 and the ROs 5 to 8 have different time domain resources. In this case, the terminal considers that the ROs 1 to 8 are all available. The terminal may select one RO from the ROs 1 to 8 with equal probability as the next available RO. Alternatively, the terminal may select two ROs from the ROs 1 to 8 with equal probability as the next available ROs.

2. Determining N most recent candidate random access resources in the candidate random access resource set as the available random access resource, where N is greater than or equal to 1.

"Most recent" herein may be a time domain corresponding to an available RACH resource that is greater than and closest to a moment at which the terminal is ready to send a RACH in time domain. Assuming that there is a plurality of ROs at a time domain location where the RACH exists, the terminal selects N most recent ROs from the plurality of ROs at the time domain location as the next available ROs. "N most recent" herein means that: N at the most recent time domain location. For example, if there is M (M being greater than or equal to N) ROs at the most recent time domain location, N most recent refers to N out of M. Alternatively, N most recent may also refer to: N nearest according to the sorting by time domain locations. For example, according to the sorting by time domain, if there are n1 (n1 being less than N), n2 (n1+n2 being greater than or equal to N), and n3 ROs on different time domain locations, N nearest refers to n1 plus (N-n1) out of n2.

1) When the candidate random access resource set is the union of the first ROs and the second ROs, the terminal may select N most recent ROs in the union with equal probability as the next available ROs.

When there are a plurality of FDM ROs on the most recent RACH time domain resource, the terminal may select N from them with equal probability, where N is greater than or equal to 1.

Taking an SSB as an example, it is assumed that the target SSB is the SSB 1 and the QCL SSB is the SSB 2. The SSB 1 corresponds to the ROs 1 to 4, and the SSB 2 corresponds to ROs 5 to 8. In addition, the ROs 1 to 4 are FDM, the ROs 5 to 8 are FDM, and the ROs 1 to 4 and the ROs 5 to 8 have different time domain resources. Assuming that a time domain corresponding to a RACH resource that is greater than and closest to the moment at which the terminal is ready to send the RACH in time domain is a time domain in which the ROs 1 to 4 are located, the terminal considers that the ROs 1 to 4 are all available. When N=1, the terminal selects one RO from the ROs 1 to 4 with equal probability as the next available RO. When N=2, the terminal selects two ROs from the ROs 1 to 4 with equal probability as the next available ROs.

Alternatively, assuming that the time domains greater than the moment at which the terminal is ready to send the RACH are sorted by distance to the moment at which the terminal is ready to send the RACH, time domains corresponding to the most recent RACH resource are the RO 1, the RO 2, the RO 3, and the RO 4, where time domain distances of the ROs 1 to 4 increases sequentially. When N=1, the terminal uses the nearest RO 1 as the next available RO. When N=2, the terminal uses the nearest RO1 and RO2 as the next available ROs.

2) When the candidate random access resource set is the intersection of the first ROs and the second ROs, the terminal may select N most recent ROs in the intersection with equal probability as the next available ROs.

When there are a plurality of FDM ROs on the most recent RACH time domain resource, the terminal may select N from them with equal probability, where N is greater than or equal to 1.

Taking an SSB as an example, it is assumed that the selected SSB is the SSB 1 and the QCL SSB is the SSB 2. The SSB 1 corresponds to the ROs 1 to 8, and the SSB 2 corresponds to the ROs 1 to 8. In addition, the ROs 1 to 4 are FDM, the ROs 5 to 8 are FDM, and the ROs 1 to 4 and the ROs 5 to 8 have different time domain resources. Assuming that a time domain corresponding to a RACH resource that is greater than and closest to the moment at which the terminal is ready to send the RACH in time domain is a time domain in which the ROs 1 to 4 are located, the terminal considers that the ROs 1 to 4 are all available. When N=1, the terminal selects one RO from the ROs 1 to 4 with equal probability as the next available RO. When N=2, the terminal selects two ROs from the ROs 1 to 4 with equal probability as the next available ROs.

Alternatively, assuming that the time domains greater than the moment at which the terminal is ready to send the RACH are sorted by distance to the moment at which the terminal is ready to send the RACH, time domains corresponding to the most recent RACH resource are the RO 1, the RO 2, the RO 3, and the RO 4, where time domain distances of the ROs 1 to 4 increases sequentially. When N=1, the terminal uses the nearest RO 1 as the next available RO. When N=2, the terminal uses the nearest RO1 and RO2 as the next available ROs.

Manner 2: Determining at least one of the first candidate random access resources or the second candidate random access resources as the available random access resource.

This manner includes, but is not limited to: determining at least one of the first ROs and at least one of the second ROs as the available random access resources for one subsequent transmission; or determining at least one of the first ROs as the available random access resource for at least one subsequent transmission; or determining at least one of the second ROs as the available random access resource for at least one subsequent transmission; or determining at least one of the first ROs as the available random access resource for the first subsequent transmission, and determining at least one of the second ROs as the available random access resource for the second subsequent transmission; or determining at least one of the second ROs as the available random access resource for the first subsequent transmission, and determining at least one of the first ROs as the available random access resource for the second subsequent transmission.

Further, in this manner, the terminal may determine the subsequent available random access resource in the following manners:

1. Sequentially determining at least one of the first candidate random access resources and at least one of the second candidate random access resources as the available random access resource.

The terminal determines the subsequent available random access resource alternately based on the first ROs and the second ROs. When there is a plurality of first ROs or a plurality of second ROs, the terminal selects at least one of these ROs with equal probability as the next available RO. The order of the first ROs and the second ROs may be: determining the next available RO first based on the target reference object and then based on the QCL reference object. Alternatively, the next available RO may be determined first based on the QCL SSB and then based on the selected SSB.

Further, the order above may be specified by different priorities. For example, priorities are defined for the target reference object and the QCL reference object, and the terminal determines at least one next available RO in the order of priorities based on different reference objects. Optionally, the priorities for the target reference object and the QCL reference object may be the same or different. When the priorities for the target reference object and the QCL reference object are the same, the order above may be: preconfigured by a manufacturer, or predefined by a protocol, or freely implemented by the terminal.

Taking an SSB as an example, it is assumed that the target SSB is the SSB 1 and the QCL SSB is the SSB 2. The SSB 1 corresponds to the ROs 1 to 4, and the SSB 2 corresponds to ROs 5 to 8. In addition, the ROs 1 to 4 are FDM, the ROs 5 to 8 are FDM, and the ROs 1 to 4 and the ROs 5 to 8 have different time domain resources. When the terminal determines the next available RO based on the target SSB, the terminal considers that the ROs 1 to 4 are all available. When N=2, the terminal selects two ROs from the ROs 1 to 4 with equal probability as the next available ROs. When the terminal determines the next available RO based on the QCL SSB, the terminal considers that the ROs 5 to 8 are all available. When N=2, the terminal selects two ROs from the ROs 5 to 8 with equal probability as the next available ROs.

2. Randomly selecting at least one reference object from the target reference object and the QCL reference object, and determining at least one of candidate random access resources corresponding to the at least one reference object as the available random access resource.

When there are a plurality of target reference objects and QCL reference objects, the terminal first selects at least one of these reference objects with equal probability, and then selects at least one of ROs corresponding to the at least one selected reference object with equal probability and determines as the at least one RO as the subsequent available random access resource.

In addition, when the target reference object or the QCL reference includes a plurality of reference objects, priorities of these reference objects may also be different. The terminal may select different target reference objects or QCL reference objects sequentially in the order of priorities. Taking an SSB as an example, it is assumed that the target reference object includes the SSB 1 and the SSB 2, and the QCL reference object includes the SSB 3 and the SSB 4. Priorities of the SSB 1 and the SSB 2 are of the highest and the third place, respectively, and priorities of the SSB 3 and the SSB 4 are of the second place and the fourth place, respectively. The terminal may determine the available RO in the order of the SSB 1, the SSB 3, the SSB 2, and the SSB 4. It should be noted that when the order above is unrelated to the priorities, the order above may be: preconfigured by a manufacturer, or predefined by a protocol, or freely implemented by the user.

Taking an SSB as an example, it is assumed that the target SSB is the SSB 1 and the QCL SSB is the SSB 2. The SSB 1 corresponds to the ROs 1 to 4, and the SSB 2 corresponds to ROs 5 to 8. In addition, the ROs 1 to 4 are FDM, the ROs 5 to 8 are FDM, and the ROs 1 to 4 and the ROs 5 to 8 have different time domain resources. The terminal selects one SSB from the SSB 1 and the SSB 2 with equal probability. When the terminal determines the next available RO based on the target SSB (the SSB 1), the terminal considers that the ROs 1 to 4 are all available. When N=2, the terminal selects two ROs from the ROs 1 to 4 with equal probability as the next available ROs. When the terminal determines the next available RO by selecting the QCL SSB (the SSB 2), the terminal considers that the ROs 5 to 8 are all available. When N=2, the terminal selects two ROs from the ROs 5 to 8 with equal probability as the next available ROs.

3. When a first preset condition is satisfied, determining at least one of the first candidate random access resources as the available random access resource.

The first preset condition may include but is not limited to:

The QCL reference object does not satisfy a specific condition. For example, a measurement result of the QCL reference object does not meet a threshold requirement.

The number of retransmissions of a message 1 (msg1) in an RO corresponding to the QCL reference object in a random access procedure reaches a predetermined number. Assuming that the preset condition is that the number of retransmissions of the msg1 exceeds N, if the terminal determines at least one next available RO first based on the QCL reference object and then based on the target reference object, there may be a transmission of the msg1 before the terminal determines the at least one next available RO based on the target reference object.

There is a specific time length reached between the current retransmission on the RO corresponding to the QCL reference object and the time of the first transmission of the msg1;

In the RO corresponding to the QCL reference object, a transmission opportunity (resource) on the at least one RO above is not obtained within a specific time window. For example, when the preset condition is that no transmission opportunity (resource) on the RO above is successfully obtained within a specific time window, if the user determines the at least one next available RO sequentially based on the QCL reference object and the target reference object, there is no transmission of the msg1 before the terminal determines the at least one next available RO based on the target reference object.

For the RO corresponding to the QCL reference object, the number of consecutive failures of listening (Listen Before Talk, LBT) reaches a predetermined number;

For the RO corresponding to the QCL reference object, the number of failures of listening (LBT) reaches a predetermined number;

No random access response (RAR) is received in the RO corresponding to the QCL reference object even after expiration of a specific time window.

4. When a second preset condition is satisfied, determining at least one of the second candidate random access resources as the available random access resource.

In this manner, the second preset condition may include but is not limited to:

The target reference object does not satisfy a specific condition. For example, a measurement result of the target reference object does not meet a threshold requirement.

The number of retransmissions of a message 1 (msg1) in an RO corresponding to the target reference object in a random access procedure reaches a predetermined number. Assuming that the preset condition is that the number of retransmissions of the msg1 exceeds N, if the terminal determines at least one next available RO first based on the target reference object and then based on the QCL reference object, there may be a transmission of the msg1 before the terminal determines the at least one next available RO based on the QCL reference object.

There is a specific time length reached between the current retransmission on the RO corresponding to the target reference object and the time of the first transmission of the msg1;

In the RO corresponding to the target reference object, a transmission opportunity (resource) on the at least one RO above is not obtained within a specific time window. For example, when the preset condition is that no transmission opportunity (resource) on the RO above is successfully obtained within a specific time window, if the user determines the at least one next available RO sequentially based on the target reference object and the QCL reference object, there is no transmission of the msg1 before the terminal determines the at least one next available RO based on the QCL reference object.

For the RO corresponding to the target reference object, the number of consecutive failures of listening (Listen Before Talk, LBT) reaches a predetermined number;

For the RO corresponding to the target reference object, the number of failures of listening (LBT) reaches a predetermined number;

No RAR is received in the RO corresponding to the target reference object even after expiration of a specific time window.

It should be noted that, in this embodiment, if the terminal determines the next available ROs, the following behavior may be included: the terminal may first attempt to obtain these RO resources, and if the resources are successfully obtained, the terminal sends the msg1 on the resource. Therefore, the process of determining the next available RO sequentially based on different target reference objects and/or QCL reference objects may also include other processes such as transmission of the msg1, and whether the other processes are included specifically depends on a preset condition, which is not limited in this embodiment of the present disclosure.

When there are a plurality of candidate available ROs and the terminal needs to select a part of them as the next available RO, in addition to the solution above, such as equal probability, there are also random selection by the terminal and selection of a good measurement result based on measurement results, for example, at least one, having a large value, of reference signal received power (RSRP), reference signal received quality (RSRQ), or a reference signal strength indicator (RSSI).

It should also be noted that in different transmission processes, the different manners listed above can be used to determine the next available RO for each transmission, and a combination of the determining manners in a plurality of transmission process is not specifically limited.

In some embodiments of the present disclosure, the target reference object corresponds to the first candidate random access resource set, and the QCL reference object corresponds to the second candidate random access resource set; before step 32, the method further includes: obtaining information about a first correspondence between the target reference object and a random access resource; and/or obtaining information about a second correspondence between the QCL reference object and a random access resource. The information about the first correspondence is used to indicate the correspondence between the target reference object and the first candidate random access resource set, and the information about the second correspondence is used to indicate the correspondence between the QCL reference object and the second candidate random access resource set.

Further, before step 31, the method further includes: obtaining QCL information, where the QCL information includes: indication information for indicating a QCL relationship between at least two reference objects, and the target reference object is at least one of the at least two reference objects. The QCL information may be predefined (for example, agreed in a protocol), or indicated by a network device, or preconfigured by a manufacturer.

Further, in some embodiments of the present disclosure, before step 32, the method further includes: determining the target reference object. A manner of determining the target reference object includes but is not limited to the following:

Manner 1: Determining through measurement

Before step 32, the method further includes: measuring a reference object to obtain a corresponding measurement result; and determining the target reference object based on the measurement result.

The measurement result includes but is not limited to: at least one of RSRP, RSRQ, or an RSSI.

Specifically, the step of determining the target reference object based on the measurement result includes one of the following:

1. Determining a reference object for which a measurement result is greater than or equal to a first threshold as the target reference object.

It is assumed that the first threshold is T, and the threshold may be predefined (for example, agreed in a protocol), or indicated by a network device, or preconfigured by a manufacturer.

2. When measurement results are all less than the first threshold, determining a reference object for which a measurement result is greater than a second threshold as the target reference object, where the second threshold is less than the first threshold.

It is assumed the first threshold is T1 and the second threshold is T2, where T1, T2, and T1-T2 each may be predefined (for example, agreed in a protocol), or indicated by a network device, or preconfigured by a manufacturer, and T1, T2, and T1-T2 may be obtained in the same or different manners. For example, T2 is indicated by the network device, T2-T1 is predefined in the protocol, and T1 may be implicitly derived based on T2 and T2-T1.

Taking an SSB as an example, the network device sends the threshold T1 and $\Delta$ ($\Delta$=T1-T2), and the terminal measures an SSB. If a measurement result of an SSB is higher than T1-$\Delta$ (that is, T2), the terminal determines the at least one next available RO based on the SSB. Optionally, if the terminal obtains the QCL information and finds that the SSB has a QCL SSB according to the QCL information, the terminal determines the at least one next available RO based on the SSB and the QCL SSB. Optionally, the user considers that all ROs corresponding to the SSB and the QCL SSB are available ROs, attempts to obtain resources of these ROs, and initiates a random access procedure on the ROs of which the resources have been successfully obtained.

The embodiment above based on an example in which a measurement result of one SSB is higher than T1-$\Delta$, and the present disclosure is also applicable to a situation in which measurement results of a plurality of SSBs are higher than T1-$\Delta$.

Method 2: Obtaining by combining and demodulating a plurality of received signals Before step 32, the method further includes: combining and demodulating a plurality of reference objects; and determining a demodulated reference object as the target reference object. The plurality of reference objects mentioned herein may be received at a time, or may be received at a plurality of times.

Taking an SSB as an example, a broadcast channel is successfully decoded by the terminal by combining SSBs a plurality of times, that is, the terminal cannot successfully perform one-shot PBCH decoding. The terminal receives and combines a plurality of SSB transmissions and successfully decodes a PBCH in the SSBs. The terminal determines the at least one next available RO based on the decoded SSB and the corresponding QCL SSBs. For example, the terminal receives a plurality of SSB 1 transmissions, and cannot decode a PBCH in SSB 1 during single decoding. After combining a plurality of SSB 1 to decode the PBCH in the SSB 1, it is considered that channel quality of the SSB 1 may be poor. Further, if the QCL information indicates that there is an SSB 2 that is quasi co-located with the SSB 1, the terminal determines the at least one next available RO based on the SSB 1 and the SSB 2. Optionally, the terminal considers that all ROs corresponding to the SSB and the QCL SSB are available ROs, attempts to obtain resources of these ROs, and initiates a random access procedure on the ROs of which the resources have been successfully obtained.

It should be noted that the foregoing embodiment is based on an example in which an SSB corresponding to one SSB index is decoded and there is only one corresponding QCL. The present disclosure is also applicable to a situation in which a plurality of SSBs corresponding to a plurality of SSB indexes are decoded, and/or each decoded SSB has a plurality of corresponding QCL SSBs. No more examples are listed one by one.

On the other hand, after step 32 in some embodiments of the present disclosure, the terminal may further perform at least one of the following behaviors:

Behavior 1: Initiating a random access procedure by using at least one available random access resource.

Specifically, in some embodiments of the present disclosure (which are not limited to Behavior 1), the random access procedure can be used for but not limited to one of the following functions: contention-based random access, contention-free random access, a system information SI request, beam failure recovery (BFR), and a preamble of a specific group. The specific group includes at least one of a group A or a group B.

This behavior means that after the terminal determines the available RO, the terminal may attempt to obtain a resource of the available RO, and send the msg1 on the RO of which the resource has been successfully obtained. If there is a plurality of available ROs, the terminal may attempt to obtain resources of these ROs, and send the msg1 on the one or more ROs of which the resources have been successfully obtained, and the terminal may send one or more msg1. Specifically, the terminal may send a plurality of msg1 on one RO, or may send one msg1 on a plurality of ROs, or may send different msg1 on different ROs.

It should be noted that in the random access procedure mentioned in some embodiments of the present disclosure, a first-step message sent by the terminal in a 4-step random access procedure is a message 1 (msg1) carrying a preamble. A first-step message sent by the terminal in a 2-step random access procedure is a message A (msgA), and the msgA may contain at least one of a preamble or data. In some embodiments of the present disclosure, the design of the msg1 in various solutions related to the msg1 is also applicable to the msgA.

It should be noted that the random access procedure may determine the preamble, such as the 4-step random access procedure (4 step-RACH) or the 2-step random access procedure (2 step-RACH); or the random access procedure may not determine the preamble, such as a 2-step random access procedure in which only data is sent directly in the msgA.

Behavior 2: Determining a target preamble transmitted on the subsequent available random access resource.

A specific implementation of Behavior 2 includes but is not limited to:

1. Determining a preamble selected with equal probability from preambles corresponding to the available random access resource as the target preamble. That is, the terminal selects and determines, with equal probability, one of preambles corresponding to a reference object of the available RO.

2. When preambles corresponding to the available random access resource at least partially overlap preambles corresponding to a random access resource used in a previous transmission, determining a preamble selected with equal probability from the overlapping preambles as the target preamble.

"At least partially overlap" includes that preambles corresponding to ROs used in two successive transmissions are completely the same and partially the same.

When the preambles corresponding to the ROs used in the two successive transmissions are exactly the same, if it is the first transmission, the terminal selects, with equal probability, one of the preambles corresponding to the determined reference object of the RO for transmission.

When the preambles corresponding to the ROs used in the two successive transmissions are partially the same, if it is the first transmission, the terminal selects, with equal probability, one of the overlapping part of the preambles corresponding to the determined reference object of the RO for transmission.

3. Determining a preamble of a previous transmission as the target preamble.

When the preambles corresponding to the ROs used in the two successive transmissions are exactly the same, if it is the second transmission, the terminal selects a preamble that is the same as the previously sent preamble for transmission.

When the preambles corresponding to the ROs used in the two successive transmissions are partially the same, if it is the second transmission, and the previously sent preamble is one the overlapping part of the preambles corresponding to the successively determined reference objects of the ROs, the terminal selects a preamble that is the same as the previously sent preamble for transmission.

4. Determining a preamble indicated by a network device as the target preamble.

If the network device does not indicate a preamble for the target reference object, and the network device indicates a preamble for the QCL reference object, the terminal uses the preamble indicated by the network device and corresponding to the QCL reference object; and vice versa. Taking an SSB as an example, for example, an RO is determined based on the target SSB (such as the SSB 1), but the network device does not indicate a preamble for the SSB 1, but indicates a preamble 2 for the QCL SSB (such as the SSB 2). After determining the RO based on the SSB 1, the terminal attempts to send the preamble 2. In contrast, an RO is determined based on the QCL SSB (such as the SSB 2), but the network device does not indicate a preamble to the SSB 2, but indicates a preamble 1 to the target SSB (such as the SSB 1). After determining the RO based on the SSB 2, the terminal attempts to send the preamble 1.

Behavior 3: Incrementing a preamble power ramping counter when a reference object corresponding to a next available random access resource is different from a reference object corresponding to a previous available random access resource.

This behavior is adjusting transmission power of the preamble, and refers to increasing the power herein. For calculation of the transmission power of the preamble, refer to: Preamble transmission power=Preamble received target power preambleReceivedTargetPower+Preamble delta DELTA_PREAMBLE (Preamble power ramping counter PREAMBLE_POWER_RAMPING_COUNTER-1)×Preamble power ramping step PREAMBLE_POWER_RAMPING_STEP. A specific manner of increasing the power includes, but is not limited to: directly increasing the transmission power of the preamble, or indirectly increasing the transmission power of the preamble. Specifically: each time when the preamble power ramping counter (PREAMBLE_POWER_RAMPING_COUNTER) is incremented, at least one of the increment, the preamble delta (DELTA_PREAMBLE), the preamble received target power (preambleReceivedTargetPower), or the preamble power ramping step (PREAMBLE_POWER_RAMPING_STEP) is greater than the corresponding parameters in other cases. For example, a delta ($\Delta$) is added to the preamble power ramping step indicated by the network device and used as the preamble power ramping step in this process. In other cases, the preamble power ramping step is the preamble power ramping step indicated by the network device. Alternatively, for example, the increment is 2 each time when the preamble power ramping counter is incremented, and in other cases, the increment is 1 each time when the preamble power ramping counter is incremented.

Taking an SSB as an example, when an SSB used in the previous time to determine the next available RO is different from an SSB used in the next time to determine the next available RO (or described as: when the terminal switches the SSB used to determine the next available RO), in the next transmission of the preamble, the preamble power ramping counter (PREAMBLE_POWER_RAMPING_COUNTER) is incremented. For example, if the available RO in the first time is determined based on the target SSB, and the available RO in the second time is determined based on the QCL SSB, the counter is incremented during the second transmission. It is assumed that the target SSB is the SSB 1 and the QCL SSB is the SSB 2. When the terminal successfully sends the msg1 based on the RO of the SSB 1 but does not receive a RAR, if the terminal selects the RO based on the SSB 1 for the next retransmission of the msg1, the terminal increases the power of the preamble, for example, increments the preamble power ramping counter.

On the other hand, when the terminal determines the available RO based on more than one reference object, that is, when there are at least two target reference objects, or there are at least one target reference object and at least one QCL reference object, after step 31, the method further includes: performing monitoring of downlink control information (DCI) based on the target reference object and/or the QCL reference object. Specifically, the monitoring behavior includes but is not limited to:

Monitoring behavior 1: Monitoring, in a search space, a monitoring occasion corresponding to a first reference object, where the first reference object is a reference object that is quasi co-located with a received RAR (or referred to as a reference object for RAR reception), or the first reference object is a reference object corresponding to a random access resource used to initiate a random access procedure. In the search space, the terminal assumes that the monitoring occasion is QCL with the reference object used when the RAR is received.

Taking an SSB as an example, in the search space, the DCI is monitored on the monitoring occasion corresponding to the SSB used when the RAR is monitored and received. It is assumed that the target SSB determined by the terminal in the RACH process is the SSB 1, and the QCL information indicates that the QCL SSB of the SSB 1 is the SSB 2. In the RACH process, the terminal determines, based on the SSB 1, that the next available RO is an RO 1, and determines, based on the SSB 2, that the next available RO is an RO 2, and the RO 1 and the RO 2 are different RO resources. The terminal successfully obtains at least one of the RO 1 or the RO 2 of the resource, and sends a preamble on it. The network device receives the preamble and feeds back a RAR. Assuming that the terminal uses the QCL of the SSB 1 to successfully receive the RAR, or the terminal determines, according to its random access radio network temporary identity (RA-RNTI), that an associated SSB of an RO resource corresponding to the RAR is the SSB 1, when the terminal receives dedicated DCI for the terminal, such as DCI scrambled using a cell radio network temporary identity (C-RNTI), in a control resource set, for example, in a search space in a control resource set 0 (CORESET #0), such as in the common search space (CSS), the terminal monitors the DCI on the monitoring occasion corresponding to the SSB 1 in the CSS. Optionally, the terminal assumes that the monitoring occasion corresponding to the SSB 1 in the CSS is QCL with the SSB 1. It should be noted that the example above is CORESET #0. For other CORESETs, such as commonControlResourceSet and controlResourceSetZero, this solution is also applicable.

Behavior 2: Monitoring, in the search space, a monitoring occasion corresponding to the target reference object and the QCL reference object. In the search space, the terminal assumes that the monitoring occasion is QCL with the target reference object and the QCL reference object.

In the search space, the DCI is monitored on a monitoring occasion corresponding to the target reference object and the QCL reference object. Specifically, in the search space, the DCI is monitored on all or a part of (that is, at least one) monitoring occasions corresponding to the target reference object and the QCL reference object. Taking an SSB as an example, in the search space, at least one of the monitoring occasions corresponding to the target SSB and the QCL SSB is monitored, where the terminal selects the monitoring occasion for monitoring by itself. Alternatively, in the search space, at least one of the target SSB or the QCL SSB is selected, and a monitoring occasion corresponding to the selected at least one SSB is monitored, where the terminal may select, based on a measurement result, an SSB of which a measurement result meets a specific threshold requirement. It is assumed that in the RACH process, the terminal determines that the target SSB is the SSB 1, and the QCL information indicates that a QCL SSB of the SSB 1 is the SSB 2. In the RACH process, the terminal determines, based on the SSB 1, that the next available RO is an RO 1, and determines, based on the SSB 2, that the next available RO is an RO 2, and the RO 1 and the RO 2 are different RO resources. The terminal successfully obtains at least one of the RO 1 or the RO 2 of the resource, and sends a preamble on it. The network device receives the preamble and feeds back a RAR. When the terminal receives dedicated DCI for the user, such as DCI scrambled using a C-RNTI, in a control resource set, for example, in a search space in the CORESET #0, such as in the CSS, the terminal monitors the DCI on a monitoring occasion corresponding to the SSB 1 and the SSB 2 in the CSS. Optionally, the terminal assumes that the monitoring occasion corresponding to the SSB 1 and the SSB 2 in the CSS is QCL with the SSB 1, and is also QCL with the SSB 2. It should be noted that the example above is CORESET #0. For other CORESETs, such as commonControlResourceSet and controlResourceSetZero, this solution is also applicable.

Some embodiments of the present disclosure above have described embodiments in which the terminal determines the next available RO based on a signal granularity. The following embodiments further describe embodiments in which the next available RO is determined based on a reference object group granularity.

Step 31 includes: obtaining a reference object group to which the target reference object belongs, where the reference object group further includes: the QCL reference object that is quasi co-located with the target reference object.

The reference object group includes a plurality of reference objects, and the plurality of reference objects are in a specific quasi co-location relationship. The number of reference objects contained in different reference object groups may be the same or different. When it is not specified that the different reference object groups are in a quasi co-location relationship, the terminals do not assume that the plurality of reference objects that belong to the different reference object groups are quasi co-located.

Further, a manner of obtaining a reference object group to which the target reference object belongs includes but is not limited to:

Manner 1: Before step 32, the method further includes: obtaining parameter information (or referred to as related information) of a reference object group to which the target reference object belongs, where the parameter information includes: at least one of spatial domain information, pattern information, or index information of the reference object group. In addition to the above information, the parameter information may further include reference object group configuration information.

The reference object group may be indicated by spatial domain information (or referred to as direction information, QCL information, QCL type information, QCL spatial domain information, or the like). The spatial domain information may be predefined (for example, agreed in a protocol), or indicated by a network device, or preconfigured by a manufacturer.

Taking an SSB as an example, it is assumed that the network device sends SSB group configuration signaling to allocate 64 SSB indexes into 8 SSB index groups, that is, divide them into 8 SSB groups. Each group contains a maximum of 8 SSB indexes, and the terminal considers that SSB indexes in the same group form an SSB group and are QCL with each other. Optionally, the network device may further send spatial domain information of each SSB group. For example, the network device sends a direction information list {direction 2, direction 3, direction 4, direction 5, direction 7, direction 6, direction 8, direction 1} for each SSB group, each direction identifier in the direction information list represents a different direction, and the direction identifiers in the direction information list are in a one-to-one correspondence with the SSB groups, so that the terminal can determine a transmission direction of each SSB group according to the spatial domain information.

In addition, the reference object group may also be indicated by pattern information and/or index information, where the pattern information and index information may also be predefined (such as agreed in a protocol), or indicated by a network device, or preconfigured by a manufacturer, and indication manners of the pattern information and the index information may be the same or different. In some embodiments, the index information of the reference object group may be implicitly or explicitly carried by some signals, such as a PBCH, a DMRS, a SIB, DCI, or other system information. Optionally, the network device may further send spatial domain information of each reference object group. For example, a direction information list {direction 2, direction 3} for each reference object group is sent, each direction identifier in the direction information list represents a different direction, and the direction identifiers in the direction information list are in a one-to-one correspondence with the reference object groups, so that the terminal can determine a transmission direction of each reference object group according to the spatial domain information.

Taking an SSB as an example, the terminal obtains a pattern of an SSB group and an index of the SSB group to determine the SSB group. For example, the protocol predefines the pattern of the SSB group, and in a pattern configuration 1 of the SSB group, the SSB 1 and the SSB 2 belong to one SSB group, and the SSB 3 and the SSB 4 belong to another SSB group. In a pattern configuration 2 of the SSB group, the SSB 1, the SSB 2, the SSB 3, and the SSB 4 belong to the same SSB group. The network device indicates that the index of the SSB group is 1, and the terminal considers that the SSB 1 and the SSB 2 belong to one SSB group and are QCL with each other. The SSB 3 and the SSB 4 belong to another SSB group and are QCL with each other.

Further, the index of the SSB group represents a spatial domain grouping factor (or referred to as a QCL factor, a grouping factor, a repetition factor, or the like), and indicates the number of SSBs included in one SSB group. For example, a value range of the index of the SSB group is {1, 2, 4, 8}. When the index of the SSB group=4, that is, the spatial domain grouping factor=4, it represents that there are 4 QCL SSBs in one SSB group. Correspondingly, the terminal can deduce the number of SSB groups based on the spatial domain grouping factor. For example, in some frequency domains, a maximum of L SSBs can be sent in one cycle. If the spatial domain grouping factor=i, there are L/i groups, and each group has i QCL SSBs. The L/i QCL SSBs in each group may be L/i SSBs with consecutive indexes, or may be SSBs corresponding to indexes discretely distributed according to a predetermined pattern. Alternatively, optionally, there is a maximum of L SSB time domain locations in one cycle. If the spatial domain grouping factor=there are L/i groups, each group has i QCL SSB time domain locations, and the SSBs sent on these time domain locations are QCL with each other. The L/i QCL SSB time domain locations in each group may be L/i time domain locations with consecutive time domain location numbers, or may be time domain locations discretely distributed according to a predetermined pattern.

Optionally, the index of the SSB group represents the number of groups, that is, indicates the number of SSB groups. For example, a value range of the index of the SSB group is {1, 2, 4, 8}. When the index of the SSB group=4, the number of SSB groups=4. Correspondingly, the terminal can deduce the number of SSBs in an SSB group based on the spatial domain grouping factor. In some frequency domains, a maximum of L SSBs can be sent in one cycle. If the number of groups=j, there are j groups, and each group has L/j QCL SSBs. The L/j QCL SSBs in each group may be L/j SSBs with consecutive indexes, or may be SSBs corresponding to indexes discretely distributed according to a predetermined pattern. Alternatively, optionally, there is a maximum of L SSB time domain locations in one cycle. If the number of groups=j, there are j groups, each group has L/j QCL SSB time domain locations, and the SSBs sent on these time domain locations are QCL with each other. The L/j QCL SSB time domain locations in each group may be L/j time domain locations with consecutive time domain location numbers, or may be time domain locations discretely distributed according to a predetermined pattern.

Manner 2: Before step 32, the method further includes: obtaining spatial domain information of the target reference object, and determining, based on the spatial domain information, a reference object group to which the target reference object belongs. The spatial domain information includes: spatial domain index information and/or a spatial domain grouping factor, and the target reference object is indicated by reference index information and/or time domain location information. It should be noted that in some embodiments of the present disclosure, the time domain location information of the reference object may be a candidate time domain location of the reference object, or may be a time domain location that is actually used to send the reference object.

The step of determining, based on the spatial domain information, a reference object group to which the target reference object belongs includes: determining that a reference object having the same spatial domain index information as the target reference object belongs to the reference object group to which the target reference object belongs. Taking an SSB as an example, the spatial domain information of the SSB is a spatial domain index (or referred to as QCL index) set, the SSB is indicated by an SSB index, and when spatial domain indexes in the spatial domain index set are in a one-to-one correspondence with SSB indexes, the terminal considers that SSB indexes corresponding to the same spatial domain index are in the same SSB group. Alternatively, the SSB may be indicated by SSB time domain location information, and when the spatial domain indexes in the spatial domain index set are in a one-to-one correspondence with the SSB time domain location information, the terminal considers that SSB time domain location information corresponding to the same spatial domain index is in the same SSB group.

Alternatively, the step of determining, based on the spatial domain information, a reference object group to which the target reference object belongs includes: determining that a reference object having the same result of a modulo operation on the spatial domain grouping factor as the target reference object belongs to the reference object group to which the target reference object belongs. Taking an SSB as an example, the spatial domain grouping factor of the SSB is a value, for example, M, the SSB is indicated by an SSB index, and when the spatial domain index=SSB index mod M, the terminal considers that SSB indexes corresponding to the same spatial domain index are in the same SSB group. In other words, the terminal considers that SSBs having the same result of a modulo operation on the spatial domain grouping factor M belong to the same SSB group. Alternatively, the SSB may also be indicated by SSB time domain location information, and when spatial domain index=SSB time domain location information (such as an SSB time domain location index) mod M, the terminal considers that SSB indexes corresponding to the same spatial domain index are in the same SSB group. In other words, the terminal considers that SSBs having the same result of time domain transmission location information modulo the spatial domain grouping factor M belongs to the same SSB group. It should be noted that in this determining manner, the number of reference object groups is M.

The parameter information of the reference object group, the spatial domain information of the reference object, and the reference object indication information (reference object index information and reference object time domain location information and the like) may be carried in but not limited to the following manners:
  explicitly carried: explicitly carried by a physical broadcast channel, a control channel, a system broadcast information block (system information block), or other radio resource control (RRC) signaling;
  predefined, preconfigured by a manufacturer, or the like;
  implicitly carrying: for example, used for at least one of reference signal (RS) sequence generation or signaling scrambling. The spatial domain information of the reference object and the reference object indication information are determined by detecting the RS sequence or descrambling. For example, the spatial domain information of the reference object and the reference object indication information may be implicitly carried by a demodulation reference signal (DMRS); and the spatial domain information of the reference object and the reference object indication information are used to generate a scrambling sequence of the PBCH, or the like.

It should be noted that the above-mentioned carrying manners are optional, and the different information (such as the spatial domain information of the reference object group, the index information of the reference object group, the spatial domain information of the reference object, the reference object indication information, or the like) mentioned in some embodiments of the present disclosure may be carried in different manners, which is not specifically limited in this embodiment.

After determining the reference object group to which the target reference object belongs, the terminal determines the next available RO based on the reference object group. Step 32 includes: determining the available random access resource according to a third correspondence between the reference object group and a random access resource. The third correspondence includes but is not limited to at least one of the following:

Information about a quantity of random access resources corresponding to the reference object group; for example, the number of SSB groups corresponding to one RO, or the number of ROs corresponding to one SSB group.

Preamble information that corresponds to the reference object group and is in the random access resource, where the preamble information is used to indicate: at least one of a preamble used for contention-based random access, a preamble used for contention-free random access, a preamble used for a system information SI request, a preamble used for beam failure recovery BFR, or a preamble used for a specific group. For example, a preamble corresponding to each SSB group on each RO is in the form of a sequence index or the number of sequences, including at least one of the following: a preamble used for contention-based random access that corresponds to each SSB group; a preamble used for contention-free random access that corresponds to each SSB group; a preamble used for an SI request that corresponds to each SSB group; a preamble used for BFR that corresponds to each SSB group; a preamble used for groupA that corresponds to each SSB group; a preamble used for groupB that corresponds to each SSB group; a power parameter of a random access resource; or a measurement threshold of a reference object group.

The power parameter of the random access resource, where the power parameter may include: at least one of an increment of the preamble power ramping counter, a delta of the preamble, the preamble received target power, or the preamble ramping step.

The measurement threshold of the reference object group, for example, the measurement threshold may be an SSB group average measurement threshold.

Further, after the step of obtaining a reference object group to which the target reference object belongs, the method further includes: obtaining information about a fourth correspondence between the reference object group and a monitoring occasion. The information about the fourth correspondence is used to indicate a quantity of monitoring occasions corresponding to the reference object group. The information about the fourth correspondence is used to indicate: a quantity of reference object groups corresponding to one group of monitoring occasions, where one group of monitoring occasions include at least one monitoring occasion. Alternatively, the information about the fourth correspondence is used to indicate a quantity of monitoring occasions corresponding to one reference object group. The reference object group and the monitoring occasion in quantity may be in one-to-one, one-to-many, or many-to-one relationship.

The information about the first correspondence, the information about the second correspondence, the information about the third correspondence, and the information about the fourth correspondence mentioned in some embodiments of the present disclosure may be predefined, or indicated by a network device, or preconfigured by a manufacturer. Manners of obtaining different correspondence information may be different, which is not limited in the embodiments of the present disclosure.

"Determine" mentioned in some embodiments of the present disclosure may also be referred to as "select", and the two words have the same meaning and are usually interchangeable; "randomly" and "with equal probability" have the same meaning and are also interchangeable.

It should be noted that in some embodiments of the present disclosure, reference objects in a specific quasi co-location relationship have QCL transitivity. Taking a discovery reference signal (DRS) as an example, a signal contained in one DRS may be at least one of an SSB, a CSI-RS, a control signal, or data. The control signal may be at least one of control signals for scheduling the remaining minimum system information (RMSI), other system information (OSI), a paging message (paging), a RAR, or a message 4 (msg4). The data signal may be at least one of the RMSI, OSI, paging, RAR, or msg4. If at least one of the signals included in one DRS and at least one of the signals included in another DRS are QCL, the other signals included in the two DRSs are also quasi co-located. If two DRSs both include an SSB and a CSI-RS, and the SSBs corresponding to the two DRSs are quasi co-located, the CSI-RSs corresponding to the two DRSs are also quasi co-located. Optionally, the CSI-RS of one of the two DRSs and the SSB of the other of the two DRSs are also quasi co-located, and vice versa. If two DRSs are quasi co-located, SSBs corresponding to the two DRSs are quasi co-located, and corresponding CSI-RSs are also quasi co-located. Optionally, the CSI-RS of one of the two DRSs and the SSB of the other of the two DRSs are also quasi co-located.

In the random access resource determining method according to some embodiments of the present disclosure, the terminal can not only determine a subsequent available random access resource based on the target reference object, but can also determine a subsequent available random access resource based on the QCL reference object that is quasi co-located with the target reference object, thereby increasing available ROs for the terminal, increasing the success rate of a random access procedure, and reducing a random access delay.

The foregoing embodiments describe the random access resource determining methods in different scenarios. The following further describes the corresponding terminal with reference to the accompanying drawings.

Figure 4:
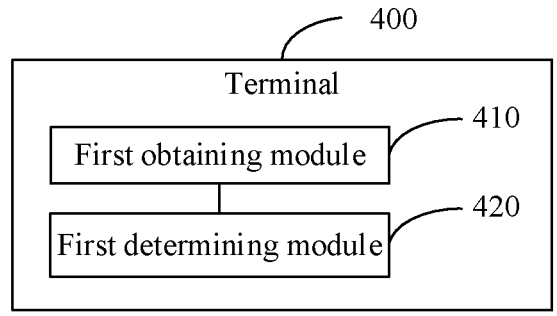
FIG. 4 represents a schematic diagram of a modular structure of a terminal according to some embodiments of the present disclosure.

As shown in FIG. 4, a terminal 400 according to some embodiments of the present disclosure can implement details of the method, in the foregoing embodiments, including: obtaining a QCL reference object that is quasi co-located with a target reference object, and determining an available random access resource based on the target reference object and the QCL reference object, with the same effects achieved. The terminal 400 specifically includes the following functional modules:

a first obtaining module 410, configured to obtain a QCL reference object that is quasi co-located with a target reference object; and a first determining module 420, configured to determine an available random access resource based on the target reference object and the QCL reference object.

The first determining module 420 includes one of the following:

a first determining submodule, configured to determine at least one candidate random access resource in a candidate random access resource set as the available random access resource, where the candidate random access resource set is the union of first candidate random access resources corresponding to the target reference object and second candidate random access resources corresponding to the QCL reference object, or the candidate random access resource set is the intersection of the first candidate random access resources and the second candidate random access resources; and a second determining submodule, configured to determine at least one of the first candidate random access resources or the second candidate random access resources as the available random access resource.

The first determining submodule includes one of the following:

a first determining unit, configured to determine at least one candidate random access resource randomly selected in the candidate random access resource set as the available random access resource; or a second determining unit, configured to determine N most recent candidate random access resources in the candidate random access resource set as the available random access resource, where N is greater than or equal to 1.

The second determining submodule includes one of the following:

a third determining unit, configured to sequentially determine at least one of the first candidate random access resources and at least one of the second candidate random access resources as the available random access resource;

a fourth determining unit, configured to randomly select at least one reference object from the target reference object and the QCL reference object, and determining at least one of candidate random access resources corresponding to the at least one reference object as the available random access resource;

a fifth determining unit, configured to determine at least one of the first candidate random access resources as the available random access resource when the first preset condition is satisfied; or a sixth determining unit, configured to determine at least one of the second candidate random access resources as the available random access resource when the second preset condition is satisfied.

The terminal 400 further includes:

a third obtaining module, configured to obtain information about the first correspondence between the target reference object and the random access resource;

and/or a fourth obtaining module, configured to obtain information about the second correspondence between the QCL reference object and the random access resource.

The terminal 400 further includes:

a second obtaining module, configured to obtain QCL information, where the QCL information includes: indication information for indicating a QCL relationship between at least two reference objects, and the target reference object is at least one of the at least two reference objects.

The terminal 400 further includes:

a measurement module, configured to measure a reference object to obtain a corresponding measurement result; and a second determining module, configured to determine the target reference object based on the measurement result.

The second determining module includes one of the following:
- a third determining submodule, configured to determine the reference object for which a measurement result is greater than or equal to a first threshold as the target reference object; and
- a fourth determining submodule, configured to determine the reference object for which a measurement result is greater than a second threshold as the target reference object when measurement results are all less than the first threshold, where the second threshold is less than the first threshold.

The terminal 400 further includes:
- a processing module, configured to combine and demodulate reference objects received a plurality of times; and
- a third determining module, configured to determine a demodulated reference object as the target reference object.

The terminal 400 further includes at least one of the following:
- an access module, configured to initiate a random access procedure by using at least one available random access resource;
- a fourth determining module, configured to determine a target preamble to be transmitted on the available random access resource; or
- a counter module, configured to increment a preamble power ramping counter when a reference object corresponding to a next available random access resource is different from a reference object corresponding to a previous available random access resource.

The fourth determining module includes:
- a fifth determining submodule, configured to determine a preamble randomly selected from preambles corresponding to the available random access resource as the target preamble;
- a sixth determining submodule, configured to: when preambles corresponding to the available random access resource at least partially overlap preambles corresponding to a random access resource used in a previous transmission, determine a preamble randomly selected from the overlapping preambles as the target preamble;
- a seventh determining submodule, configured to determine a preamble of a previous transmission as the target preamble; or
- an eighth determining submodule, configured to determine a preamble indicated by a network device as the target preamble.

The terminal 400 further includes: a monitoring module, where
- when there are at least two target reference objects, or there is at least one target reference object and at least one QCL reference object,
  - the monitoring module is configured to: monitor, in a search space, a monitoring occasion corresponding to a first reference object, where the first reference object is a reference object that is quasi-co-located with a received random access response, or the first reference object is a reference object corresponding to a random access resource used to initiate a random access procedure;
  - or
  - the monitoring module is configured to: monitor, in the search space, a monitoring occasion corresponding to the target reference object and the QCL reference object.

The first obtaining module 410 includes:
- an obtaining submodule, configured to obtain a reference object group to which the target reference object belongs, where the reference object group further includes: the QCL reference object that is quasi co-located with the target reference object.

The terminal 400 further includes:
- a third obtaining module, configured to obtain parameter information of a reference object group to which the target reference object belongs, where the parameter information includes: at least one of spatial domain information, pattern information, or index information of the reference object group.

The terminal 400 includes:
- a fourth obtaining module, configured to obtain spatial domain information of the target reference object, where the spatial domain information includes: spatial domain index information and/or a spatial domain grouping factor, and the target reference object is indicated by reference index information and/or time domain location information; and
- a determining unit, configured to determine, based on the spatial domain information, a reference object group to which the target reference object belongs.

The determining unit includes:
- a first determining subunit, configured to determine that a reference object having the same spatial domain index information as the target reference object belongs to the reference object group to which the target reference object belongs;
or
- a second determining subunit, configured to determine that a reference object having the same result of a modulo operation on the spatial domain grouping factor as the target reference object belongs to the reference object group to which the target reference object belongs.

The first determining module 420 further includes:
- a tenth determining submodule, configured to determine the available random access resource according to a third correspondence between the reference object group and a random access resource.

The terminal 400 further includes:
- a third obtaining submodule, configured to obtain information about a fourth correspondence between the reference object group and a monitoring occasion, where the information about the fourth correspondence is used to indicate a quantity of monitoring occasions corresponding to the reference object group.

It should be noted that the terminal according to some embodiments of the present disclosure can not only determine a subsequent available random access resource based on the target reference object, but can also determine a subsequent available random access resource based on the QCL reference object that is quasi co-located with the target reference object, thereby increasing available ROs for the terminal, increasing the success rate of a random access procedure, and reducing a random access delay.

Figure 5:
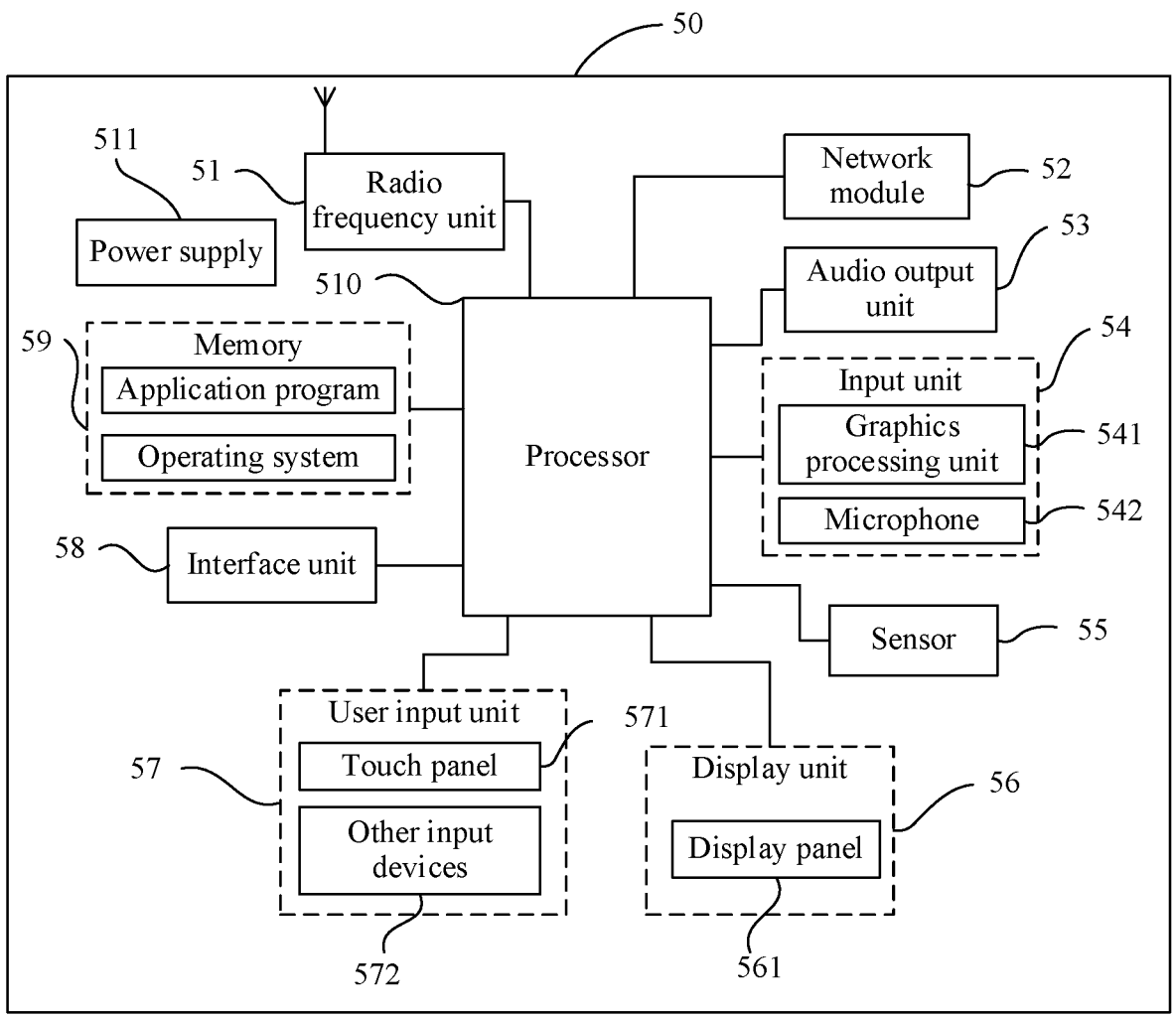
FIG. 5 represents a block diagram of a terminal according to some embodiments of the present disclosure.

To better achieve the foregoing objective, further, FIG. 5 is a schematic structural diagram of hardware of a terminal for implementing the various embodiments of the present disclosure. The terminal 50 includes, but is not limited to, components such as a radio frequency unit 51, a network module 52, an audio output unit 53, an input unit 54, a sensor 55, a display unit 56, a user input unit 57, an interface unit 58, a memory 59, a processor 510, and a power supply 511. Those skilled in the art may understand that the terminal structure shown in FIG. 5 does not constitute a limitation to the terminal. The terminal may include more or fewer components than those shown in the figure, or some components may be combined, or there may be a different component arrangement. In some embodiments of the present disclosure, the terminal includes but is not limited to a mobile phone, a tablet computer, a notebook computer, a palmtop computer, an in-vehicle terminal, a wearable device, a pedometer, and the like.

The radio frequency unit 51 is configured to obtain a QCL reference object that is quasi co-located with a target reference object.

The processor 510 is configured to determine a subsequent available random access resource based on the target reference object and the QCL reference object.

The terminal according to some embodiments of the present disclosure can not only determine a subsequent available random access resource based on the target reference object, but can also determine a subsequent available random access resource based on the QCL reference object that is quasi co-located with the target reference object, thereby increasing available ROs for the terminal, increasing the success rate of a random access procedure, and reducing a random access delay.

It should be understood that in this embodiment of the present disclosure, the radio frequency unit 51 may be configured to receive and send signals in a process of receiving and sending information or calling. Specifically, after receiving downlink data from a base station, the radio frequency unit 51 sends the downlink data to the processor 510 for processing; and sends uplink data to the base station. Generally, the radio frequency unit 51 includes, but is not limited to, an antenna, at least one amplifier, a transceiver, a coupler, a low noise amplifier, a duplexer, and the like. In addition, the radio frequency unit 51 may further communicate with another device by using a wireless communications system and network.

The terminal provides a user with wireless broadband Internet access through the network module 52, for example, helps the user send and receive emails, browse web pages, and access streaming media.

The audio output unit 53 can convert audio data received by the radio frequency unit 51 or the network module 52 or stored in the memory 59 into an audio signal, and output the audio signal into sound. In addition, the audio output unit 53 can also provide audio output related to a specific function performed by the terminal 50 (for example, call signal receiving sound or message receiving sound). The audio output unit 53 includes a speaker, a buzzer, a telephone receiver, and the like.

The input unit 54 is configured to receive audio or video signals. The input unit 54 may include a graphics processing unit (GPU) 541 and a microphone 542. The graphics processing unit 541 processes image data of a static image or a video obtained by an image capturing apparatus (such as, a camera) in a video capturing mode or an image capturing mode. A processed image frame can be displayed on the display unit 56. The image frame processed by the graphics processing unit 541 can be stored in the memory 59 (or another storage medium) or sent via the radio frequency unit 51 or the network module 52. The microphone 542 may receive sound and can process such sound into audio data. The processed audio data may be converted, in a call mode, into a format that can be sent by the radio frequency unit 51 to a mobile communication base station for output.

The terminal 50 further includes at least one sensor 55, such as a light sensor, a motion sensor, and another sensor. Specifically, the light sensor includes an ambient light sensor and a proximity sensor, where the ambient light sensor can adjust brightness of the display panel 561 based on brightness of ambient light, and the proximity sensor can turn off the display panel 561 and/or backlight when the terminal 50 moves towards the ear. As a type of motion sensor, an accelerometer sensor can detect magnitudes of accelerations in all directions (usually three axes), can detect a magnitude and a direction of gravity when the mobile phone is in a static state, and can be applied to mobile phone posture recognition (such as screen switching between portrait and landscape, related games, and magnetometer posture calibration), functions related to vibration recognition (such as pedometer and tapping), and the like. The sensor 55 may also include a fingerprint sensor, a pressure sensor, an iris sensor, a molecular sensor, a gyroscope, a barometer, a hygrometer, a thermometer, an infrared sensor, and the like. Details are not described herein.

The display unit 56 is configured to display information entered by a user or information provided for the user. The display unit 56 may include a display panel 561, and the display panel 561 may be configured in a form of liquid crystal display (LCD), organic light-emitting diode (OLED), or the like.

The user input unit 57 may be configured to receive inputted digit or character information and generate key signal input related to user setting and function control of the terminal. Specifically, the user input unit 57 includes a touch panel 571 and another input device 572. The touch panel 571 is also referred to as a touchscreen, and may collect a touch operation of the user on or near the touch panel (for example, an operation performed on or near the touch panel 571 by the user by using any appropriate object or accessory such as a finger or a stylus). The touch panel 571 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 510, and can receive and execute a command sent by the processor 510. In addition, the touch panel 571 can be implemented in various types such as resistive, capacitive, infrared, and surface acoustic waves. In addition to the touch panel 571, the user input unit 57 may further include the another input device 572. Specifically, the another input device 572 may include but is not limited to at least one of a physical keyboard, a functional button (such as a volume control button or a power on/off button), a trackball, a mouse, or a joystick. Details are not described herein.

Further, the touch panel 571 can cover the display panel 561. When detecting a touch operation on or near the touch panel 571, the touch panel 571 transmits the touch operation to the processor 510 to determine a type of a touch event. Then, the processor 510 provides a corresponding visual output on the display panel 561 based on the type of the touch event. In FIG. 5, the touch panel 571 and the display panel 561 are used as two independent components to implement input and output functions of the terminal. However, in some embodiments, the touch panel 571 and the display panel 561 may be integrated to implement the input and output functions of the terminal. This is not specifically limited herein.

The interface unit 58 is an interface connecting an external apparatus to the terminal 50. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, and a headset port. The interface unit 58 can be configured to receive an input (for example, data information and power) from the external apparatus and transmit the received input to one or more elements in the terminal 50, or transmit data between the terminal 50 and the external apparatus.

The memory 59 may be configured to store software programs and various data. The memory 59 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 59 may include a high-speed random access memory, and may further include a nonvolatile memory, for example, at least one magnetic disk storage device, a flash storage device, or another volatile solid-state storage device.

The processor 510 is a control center of the terminal, and connects all parts of the entire terminal by using various interfaces and lines. By running or executing a software program and/or a module stored in the memory 59 and invoking data stored in the memory 59, the processor 510 performs various functions of the terminal and data processing, to perform overall monitoring on the terminal. The processor 510 may include one or more processing units. Optionally, the processor 510 may integrate an application processor and a modem processor. The application processor mainly processes an operating system, a user interface, an application program, and the like. The modem processor mainly processes wireless communication. It may be understood that, alternatively, the modem processor may not be integrated into the processor 510.

The terminal 50 may also include a power supply 511 (for example, a battery) that supplies power to various components. Optionally, the power supply 511 may be logically connected to the processor 510 through a power supply management system, to perform functions of managing charging, discharging, and power consumption through the power supply management system.

In addition, the terminal 50 includes some functional modules not shown. Details are not described herein again.

Optionally, some embodiments of the present disclosure further provide a terminal, including a processor 510, a memory 59, and a computer program that is stored in the memory 59 and that can run on the processor 510. When the computer program is executed by the processor 510, the processes of the foregoing random access resource determining method embodiment are implemented, and the same technical effects can be achieved. To avoid repetition, details are not described herein again. The terminal may be a wireless terminal or a wired terminal. The wireless terminal may be a device providing voice and/or other service data connectivity to a user, a handheld device with a wireless connection function, or another processing device connected to a wireless modem. The wireless terminal may communicate with one or more core networks through a radio access network (RAN). The wireless terminal may be a mobile terminal, such as a mobile phone (or referred to as a "cellular" phone) and a computer with a mobile terminal, and may be, for example, a portable, pocket-sized, handheld, computer built-in, or vehicle-mounted mobile apparatus, which exchange language and/or data with a radio access network. For example, Personal Communication Service (PCS) telephone, cordless telephone, Session Initiation Protocol (SIP) telephone, Wireless Local Loop (WLL) station, Personal Digital Assistant (PDA) and other devices. The wireless terminal may also be referred to as a system, a subscriber unit, a subscriber station, a mobile station, a mobile console, a remote station, a remote terminal, an access terminal, a user terminal, a user agent, or a user device or user equipment. This is not limited herein.

Some embodiments of the present disclosure further provide a computer-readable storage medium, where the computer readable storage medium stores a computer program, when the computer program is executed by the processor, the processes of the foregoing embodiments of the random access resource determining method are implemented, and the same technical effects can be achieved. To avoid repetition, details are not described herein again. The computer-readable storage medium is, for example, a Read-Only Memory (ROM), a Random Access Memory (RAM) or an optical disc.

The foregoing embodiment describes the random access resource determining method of the present disclosure on the terminal side. The following embodiment further describes the random access resource determining method on a network device side with reference to the accompanying drawings.

As shown in FIG. 6, the random access resource determining method in some embodiments of the present disclosure is applied to a network device side. The method includes the following steps:

Step 61: Send, to a terminal, parameter information of a reference object group to which a target reference object belongs, where the reference object group further includes: a QCL reference object that is quasi co-located with the target reference object.

The reference object group includes a plurality of reference objects, and the plurality of reference objects are in a specific quasi co-location relationship. The number of reference objects contained in different reference object groups may be the same or different. When it is not specified that the different reference object groups are in a quasi co-location relationship, the plurality of reference objects that belong to the different reference object groups may be quasi co-located, or may not be quasi co-located.

In some embodiments of the present disclosure, the parameter information includes but is not limited to: at least one of configuration information, spatial domain information, pattern information, or index information of the reference object group. The reference object group may be indicated by spatial domain information (or referred to as direction information, QCL information, QCL type information, QCL spatial domain information, or the like). The spatial domain information may be predefined (for example, agreed in a protocol), or indicated by a network device, or preconfigured by a manufacturer. In addition, the reference object group may also be indicated by pattern information and/or index information, where the pattern information and index information may also be predefined (such as agreed in a protocol), or indicated by a network device, or preconfigured by a manufacturer, and indication manners of the pattern information and the index information may be the same or different. In some embodiments, the index information of the reference object group may be implicitly or explicitly carried by some signals, such as a PBCH, a DMRS, a SIB, DCI, or other system information. Optionally, the network device may further send spatial domain information of each reference object group. For example, a direction information list {direction 2, direction 3} for each reference object group is sent, each direction identifier in the direction information list represents a different direction, and the direction identifiers in the direction information list are in a one-to-one correspondence with the reference object groups, so that the terminal can determine a transmission direction of each reference object group according to the spatial domain information.

Before step 61, the method further includes: sending spatial domain information of the target reference object to the terminal, where the spatial domain information includes: spatial domain index information and/or a spatial domain grouping factor, and the target reference object is indicated by reference index information and/or time domain location information. It should be noted that in some embodiments of the present disclosure, the time domain location information of the reference object may be a candidate time domain location of the reference object, or may be a time domain location that is actually used to send the reference object. Correspondingly, the terminal may determine that a reference object having the same spatial domain index information as the target reference object belongs to the reference object group to which the target reference object belongs; or determine that a reference object having the same result of a modulo operation on the spatial domain grouping factor as the target reference object belongs to the reference object group to which the target reference object belongs.

Further, before or after step 61, the method further includes at least one of the following:
  sending information about a first correspondence between the target reference object and a random access resource to the terminal;
  sending information about a second correspondence between the QCL reference object and a random access resource to the terminal;
  sending a third correspondence between the reference object group and a random access resource to the terminal, where the third correspondence includes but is not limited to at least one of the following: information about a quantity of random access resources corresponding to the reference object group; preamble information that corresponds to the reference object group and is in the random access resource, where the preamble information is used to indicate: at least one of a preamble used for contention-based random access, a preamble used for contention-free random access, a preamble used for a system information SI request, a preamble used for beam failure recovery BFR, or a preamble used for a specific group; a power parameter of the random access resource, where the power parameter may include: at least one of an increment of the preamble power ramping counter, a delta of the preamble, the preamble received target power, or the preamble ramping step; and a measurement threshold of the reference object group; or
  sending information about a fourth correspondence between the reference object group and a monitoring occasion, where the information about the fourth correspondence is used to indicate a quantity of monitoring occasions corresponding to the reference object group.

Reference can be made to the embodiments on the terminal side for the specific implementation of the information about the first correspondence, the information about the second correspondence, the information about the third correspondence, and the information about the fourth correspondence. Details are not described herein again. In addition, in some embodiments of the present disclosure, the embodiment on the network device side corresponds to the embodiment on the terminal side. Those skilled in the art should be able to understand that the above embodiments on the terminal side can be transformed into the embodiments on the network device side through interactive correspondence, and therefore details are not repeated herein.

In the random access resource determining method according to this embodiment of the present disclosure, the network device sends, to the terminal, the reference object group to which the target reference object belongs, where other reference objects in the reference object group are quasi co-located with the target reference object. In this way, the terminal can determine a subsequent available random access resource based on the reference object group. In other words, the terminal can not only determine a subsequent available random access resource based on the target reference object, but can also determine a subsequent available random access resource based on the QCL reference object that is quasi co-located with the target reference object, thereby increasing available ROs for the terminal, increasing the success rate of a random access procedure, and reducing a random access delay.

The foregoing embodiments describe in detail the random access resource determining methods in different scenarios. The following embodiments further describe the corresponding network device with reference to the accompanying drawings.

As shown in FIG. 7, a network device 700 according to this embodiment of the present disclosure can implement details of the method, in the foregoing embodiments, including: sending, to a terminal, parameter information of a reference object group to which a target reference object belongs, where the reference object group further includes: a QCL reference object that is quasi co-located with the target reference object, with the same effects achieved. The network device 700 specifically includes the following functional modules:
  a first sending module 710, configured to send, to a terminal, parameter information of a reference object group to which a target reference object belongs, where the reference object group further includes: a QCL reference object that is quasi co-located with the target reference object.

The parameter information includes: at least one of spatial domain information, pattern information, or index information of the reference object group.

The network device 700 further includes:
  a second sending module, configured to send spatial domain information of the target reference object to the terminal, where the spatial domain information includes: spatial domain index information and/or a spatial domain grouping factor, and the target reference object is indicated by reference index information and/or time domain location information.

The network device 700 further includes at least one of the following:
  a third sending module, configured to send information about a first correspondence between the target reference object and a random access resource to the terminal;
  a fourth sending module, configured to send information about a second correspondence between the QCL reference object and a random access resource to the terminal;

a fifth sending module, configured to send a third correspondence between the reference object group and a random access resource to the terminal; or a sixth sending module, configured to send information about a fourth correspondence between the reference object group and a monitoring occasion to the terminal, where the information about the fourth correspondence is used to indicate a quantity of monitoring occasions corresponding to the reference object group.

It should be noted that the network device according to some embodiments of the present disclosure sends, to the terminal, the reference object group to which the target reference object belongs, where other reference signals in the reference object group are quasi co-located with the target reference object. In this way, the terminal can determine a subsequent available random access resource based on the reference object group. In other words, the terminal can not only determine a subsequent available random access resource based on the target reference object, but can also determine a subsequent available random access resource based on the QCL reference object that is quasi co-located with the target reference object, thereby increasing available ROs for the terminal, increasing the success rate of a random access procedure, and reducing a random access delay.

It should be noted that, division of the modules of the network device and the terminal is merely logical function division, and in actual implementation, the modules may be all or partially integrated into one physical entity, or may be physically separated. In addition, these modules may all be implemented in the form of software being invoked by processing elements; or may all be implemented in the form of hardware; or some of the modules may be implemented in the form of software being invoked by processing elements, and some of the modules may be implemented in the form of hardware. For example, the determining module may be a separately disposed processing element, or may be integrated into a chip of the foregoing apparatus for implementation. In addition, the determining module may also be stored in the memory of the foregoing apparatus in the form of program code, and a processing element of the foregoing apparatus invokes the program code and performs the functions of the foregoing determining module. The implementation of other modules is similar thereto. In addition, all or some of these modules may be integrated together or implemented independently. The processing element herein may be an integrated circuit having a signal processing capability. During implementation, the steps of the foregoing method or the foregoing modules can be completed by hardware integrated logic circuits in the processor element or indications in the form of software.

For example, the above modules can be configured into one or more integrated circuits to perform the above methods, such as: one or more Application Specific Integrated Circuits (ASIC), one or more digital signal processors (DSP), one or more Field Programmable Gate Arrays (FPGA), or the like. For another example, when a module above is implemented by invoking program code by using a processing element, the processing element may be a general-purpose processor, for example, a central processing unit (CPU) or another processor that can invoke program code. For another example, these modules may be integrated together and implemented in the form of a system-on-a-chip (SOC).

To better achieve the foregoing objective, some embodiments of the present disclosure further provide a network device, including a processor, a memory, and a computer program stored in the memory and capable of running on the processor, where when the processor executes the computer program, the steps of the foregoing random access resource determining method are implemented. An embodiment of the present disclosure further provides a computer-readable storage medium, where the computer-readable storage medium stores a computer program, and when the computer program is executed by a processor, the steps of the foregoing random access resource determining method are implemented.

Specifically, some embodiments of the present disclosure further provide a network device. As shown in FIG. 8, the network device 800 includes: an antenna 81, a radio frequency apparatus 82, and a baseband apparatus 83. The antenna 81 is connected to the radio frequency apparatus 82. In the uplink direction, the radio frequency apparatus 82 receives information through the antenna 81, and sends the received information to the baseband apparatus 83 for processing. In the downlink direction, the baseband apparatus 83 processes information to be sent and sends the information to the radio frequency apparatus 82, and the radio frequency apparatus 82 processes the received information and then sends the information through the antenna 81.

The foregoing band processing apparatus may be located in the baseband apparatus 83, and the method performed by the network device in the foregoing embodiment may be implemented in the baseband apparatus 83. The baseband apparatus 83 includes a processor 84 and a memory 85.

The baseband apparatus 83 may include, for example, at least one baseband board, and a plurality of chips are arranged on the baseband board. As shown in FIG. 8, one of the chips is, for example, the processor 84, which is connected to the memory 85, to invoke a program in the memory 85, so as to perform the operations of the network device shown in the foregoing method embodiment.

The baseband apparatus 83 may further include a network interface 86 for exchanging information with the radio frequency apparatus 82. The interface is, for example, a common public radio interface (CPRI).

The processor herein may be a single processor, or may be a collective term for a plurality of processing elements. For example, the processor may be a CPU or an ASIC, or may be one or more integrated circuits that are configured to implement the foregoing method performed by the network device, for example, may be one or more microprocessors DSPs, or one or more field programmable gate arrays FPGAs. The storage element may be one memory or a collective term for a plurality of storage elements.

The memory 85 may be a volatile memory or a non-volatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. As exemplary but not limitative descriptions, many forms of RAMs may be used, such as a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synclink dynamic random access memory (SLDRAM), and a direct rambus random access memory (DRRAM). The memory 85 described in this application is intended to include but not limited to these and any other suitable types of memories.

Specifically, the network device in some embodiments of the present disclosure further includes a computer program that is stored in the memory 85 and that can run on the processor 84. The processor 84 invokes the computer program in the memory 85 to perform the method performed by the modules shown in FIG. 7.

Specifically, when being invoked by the processor 84, the computer program may be configured to: send, to a terminal, parameter information of a reference object group to which a target reference object belongs, where the reference object group further includes: a QCL reference object that is quasi co-located with the target reference object.

The network device according to some embodiments of the present disclosure sends, to the terminal, the reference object group to which the target reference object belongs, where other reference signals in the reference object group are quasi co-located with the target reference object. In this way, the terminal can determine a subsequent available random access resource based on the reference object group. In other words, the terminal can not only determine a subsequent available random access resource based on the target reference object, but can also determine a subsequent available random access resource based on the QCL reference object that is quasi co-located with the target reference object, thereby increasing available ROs for the terminal, increasing the success rate of a random access procedure, and reducing a random access delay.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art can clearly understand that to describe conveniently and concisely, for a specific working process of the system, apparatus, and unit described above, refer to the corresponding process in the foregoing method embodiments. Details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit.

If the function is implemented in the form of software function units and sold or used as independent products, the function may be stored in a computer readable storage medium. Based on such an understanding, the technical solutions of the present disclosure essentially, or the part contributing to the related art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The storage medium includes various mediums, such as a USB flash disk, a removable hard disk, a ROM, a RAM, a magnetic disk, or an optical disc, that can store program code.

In addition, it should be noted that in the apparatuses and methods of the present disclosure, it is obvious that the components or the steps may be divided and/or recombined. These divisions and/or recombinations should be considered as equivalent solutions of the present disclosure. Moreover, the steps for performing the foregoing series of processing may be performed naturally in chronological order according to a described sequence, but do not necessarily need to be performed in chronological order, and some steps may be performed in parallel or independently. Those of ordinary skill in the art can understand that all or any steps or components of the method and apparatus in the present disclosure may be implemented by hardware, firmware, software, or a combination thereof in any computing apparatus (including a processor, a storage medium, and the like) or a network of a computing apparatus. This can be implemented as long as those of ordinary skill in the art apply basic programming skill after reading the description of the present disclosure.

Therefore, the objective of the present disclosure may also be achieved by running a program or a set of programs on any computing apparatus. The computing apparatus may be a well-known general-purpose apparatus. Therefore, the objective of the present disclosure may also be achieved only by providing a program product including program code for implementing the method or the apparatus. In other words, such a program product also constitutes the present disclosure, and a storage medium storing such a program product also constitutes the present disclosure. Obviously, the storage medium may be any well-known storage medium or any storage medium to be developed in the future. It should also be noted that in the apparatus and method of the present disclosure, apparently, the components or steps may be divided and/or recombined. These divisions and/or recombinations should be considered as equivalent solutions of the present disclosure. Moreover, the steps for performing the foregoing series of processing may be performed naturally in chronological order according to a described sequence, but do not necessarily need to be performed in chronological order, and some steps may be performed in parallel or independently.

It can be understood that those embodiments described in the embodiments of the present disclosure can be implemented by hardware, software, firmware, middleware, microcode, or a combination thereof. For implementation with hardware, the processing unit may be implemented in one or more application specific integrated circuits (ASIC), a digital signal processor (DSP), a digital signal processing device (DSPD), a programmable logic device (PLD), a field-programmable gate array (FPGA), a general-purpose processor, a controller, a microcontroller, a microprocessor, another electronic unit for implementing the functions of the present disclosure, or a combination thereof.

For implementation by software, technologies described in the embodiments of the present disclosure may be implemented by executing functional modules (for example, a process and a function) in the embodiments of the present disclosure. Software codes can be stored in the memory and executed by the processor. The memory can be implemented inside or outside the processor.

The foregoing descriptions are merely optional implementations of the present disclosure. It should be noted that a person of ordinary skill in the art may make several improvements and polishing without departing from the principle of the present disclosure and the improvements and polishing shall fall within the protection scope of the present disclosure.

What is claimed is:

1. A random access resource determining method, applied to a terminal side, the method comprising:
   obtaining a quasi co-location (QCL) reference object that is quasi co-located with a target reference object, wherein each of the target reference object and the QCL reference object comprises a synchronization signal and PBCH block (SSB); and
   determining an available random access resource based on a correspondence between a reference object group and a random access resource, wherein the reference object group comprises the target reference object and the QCL reference object,
   wherein information about the correspondence between the reference object group and the random access resource comprises at least one of the following:
      information about a quantity of random access resources corresponding to the reference object group;
      preamble information that corresponds to the reference object group and is in the random access resource, wherein the preamble information is used to indicate at least one of a preamble used for contention-based random access, a preamble used for contention-free random access, a preamble used for a system information SI request, a preamble used for beam failure recovery BFR, or a preamble used for a specific group;
      a power parameter of the random access resource; or
      a measurement threshold for the reference object group.

2. The random access resource determining method according to claim 1, wherein determining the available random access resource comprises:
   determining at least one candidate random access resource in a candidate random access resource set as the available random access resource, wherein the candidate random access resource set is a union of first candidate random access resources corresponding to the target reference object and second candidate random access resources corresponding to the QCL reference object, or the candidate random access resource set is an intersection of the first candidate random access resources and the second candidate random access resources; or
   determining at least one of the first candidate random access resources or the second candidate random access resources as the available random access resource.

3. The random access resource determining method according to claim 2, wherein determining at least one candidate random access resource in a candidate random access resource set as the available random access resource comprises:
   determining at least one candidate random access resource randomly selected in the candidate random access resource set as the available random access resource; or
   determining N most recent candidate random access resources in the candidate random access resource set as the available random access resource, wherein N is greater than or equal to 1.

4. The random access resource determining method according to claim 2, wherein determining at least one of the first candidate random access resources or the second candidate random access resources as the available random access resource comprises one of the following:
   sequentially determining at least one of the first candidate random access resources and at least one of the second candidate random access resources as the available random access resource;
   randomly selecting at least one reference object from the target reference object and the QCL reference object, and determining at least one of candidate random access resources corresponding to the at least one reference object as the available random access resource;
   when a first preset condition is satisfied, determining at least one of the first candidate random access resources as the available random access resource; or
   when a second preset condition is satisfied, determining at least one of the second candidate random access resources as the available random access resource.

5. The random access resource determining method according to claim 1, wherein, before obtaining the QCL reference object that is quasi co-located with the target reference object, the method further comprises:
   obtaining QCL information, wherein the QCL information comprises indication information for indicating a QCL relationship between at least two reference objects, and the target reference object is at least one of the at least two reference objects.

6. The random access resource determining method according to claim 1, wherein, before determining the available random access resource, the method further comprises:
   measuring a reference object to obtain a corresponding measurement result; and
   determining the target reference object based on the measurement result, wherein determining the target reference object based on the measurement result comprises:
      determining a reference object for which a measurement result is greater than or equal to a first threshold as the target reference object; or
      when measurement results are all less than the first threshold, determining a reference object for which a measurement result is greater than a second threshold as the target reference object, wherein the second threshold is less than the first threshold.

7. The random access resource determining method according to claim 1, wherein, after determining the available random access resource, the method further comprises at least one of the following:
initiating a random access procedure by using at least one available random access resource;
determining a target preamble to be transmitted on the available random access resource; or
incrementing a preamble power ramping counter when a reference object corresponding to a next available random access resource is different from a reference object corresponding to the available random access resource, wherein determining the target preamble to be transmitted on the available random access resource comprises:
  determining a preamble randomly selected from preambles corresponding to the available random access resource as the target preamble;
  when preambles corresponding to the available random access resource at least partially overlap preambles corresponding to a random access resource used in a previous transmission, determining a preamble randomly selected from the overlapping preambles as the target preamble;
  determining a preamble of a previous transmission as the target preamble; or
  determining a preamble indicated by a network device as the target preamble.

8. The random access resource determining method according to claim 1, wherein, after obtaining the QCL reference object that is quasi co-located with the target reference object, the method further comprises:
  when there are at least two target reference objects, or there is at least one target reference object and at least one QCL reference object,
  monitoring, in a search space, a monitoring occasion corresponding to a first reference object, wherein the first reference object is a reference object that is quasi-co-located with a received random access response, or the first reference object is a reference object corresponding to a random access resource used to initiate a random access procedure;
  or
  monitoring, in the search space, a monitoring occasion corresponding to the target reference object and the QCL reference object.

9. The random access resource determining method according to claim 1, wherein, before determining the available random access resource the method further comprises:
  obtaining parameter information of a reference object group to which the target reference object belongs, wherein the parameter information comprises at least one of spatial domain information, pattern information, or index information of the reference object group;
  or
  obtaining spatial domain information of the target reference object, wherein the spatial domain information comprises spatial domain index information or a spatial domain grouping factor, and the target reference object is indicated by reference index information or time domain location information; and
  determining, based on the spatial domain information, a reference object group to which the target reference object belongs.

10. The random access resource determining method according to claim 9, wherein determining, based on the spatial domain information, the reference object group to which the target reference object belongs comprises:
  determining that a reference object having same spatial domain index information as the target reference object belongs to the reference object group to which the target reference object belongs;
  or
  determining that a reference object having a same result of a modulo operation on the spatial domain grouping factor as the target reference object belongs to the reference object group to which the target reference object belongs.

11. The random access resource determining method according to claim 1, wherein, further comprising:
  obtaining information about a fourth correspondence between the reference object group and a monitoring occasion, wherein information about the fourth correspondence is used to indicate a quantity of monitoring occasions corresponding to the reference object group.

12. A terminal, comprising a processor, a memory, and a computer program stored in the memory and running on the processor, wherein the computer program, when executed by the processor, causes the processor to:
  obtain a quasi co-location (QCL) reference object that is quasi co-located with a target reference object, wherein each of the target reference object and the QCL reference object comprises a synchronization signal and PBCH block (SSB); and
  determine an available random access resource based on a correspondence between a reference object group and a random access resource, wherein the reference object group comprises the target reference object and the QCL reference object,
  wherein information about the correspondence between the reference object group and the random access resource comprises at least one of the following:
    information about a quantity of random access resources corresponding to the reference object group;
    preamble information that corresponds to the reference object group and is in the random access resource, wherein the preamble information is used to indicate at least one of a preamble used for contention-based random access, a preamble used for contention-free random access, a preamble used for a system information SI request, a preamble used for beam failure recovery BFR, or a preamble used for a specific group;
    a power parameter of the random access resource; or
    a measurement threshold for the reference object group.

13. The terminal according to claim 12, wherein, to determine the available random access resource, the computer program, when executed by the processor, further causes the processor to:
  determine at least one candidate random access resource in a candidate random access resource set as the available random access resource, wherein the candidate random access resource set is a union of first candidate random access resources corresponding to the target reference object and second candidate random access resources corresponding to the QCL reference object, or the candidate random access resource set is an intersection of the first candidate random access resources and the second candidate random access resources; or
  determine at least one of the first candidate random access resources or the second candidate random access resources as the available random access resource.

14. The terminal according to claim 12, wherein the computer program, when executed by the processor, further causes the processor to:
before obtaining the QCL reference object that is quasi co-located with the target reference object, obtain QCL information, wherein the QCL information comprises indication information for indicating a QCL relationship between at least two reference objects, and the target reference object is at least one of the at least two reference objects.

15. The terminal according to claim 12, wherein the computer program, when executed by the processor, further causes the processor to:
before determining the available random access resource, measure a reference object to obtain a corresponding measurement result; and
determine the target reference object based on the measurement result, wherein, to determine the target reference object based on the measurement result, the computer program, when executed by the processor, further causes the processor to:
determine a reference object for which a measurement result is greater than or equal to a first threshold as the target reference object; or
when measurement results are all less than the first threshold, determine a reference object for which a measurement result is greater than a second threshold as the target reference object, wherein the second threshold is less than the first threshold.

16. The terminal according to claim 12, wherein, when there are at least two target reference objects, or there is at least one target reference object and at least one QCL reference object, the computer program, when executed by the processor, further causes the processor to:
monitor, in a search space, a monitoring occasion corresponding to a first reference object, wherein the first reference object is a reference object that is quasi-co-located with a received random access response, or the first reference object is a reference object corresponding to a random access resource used to initiate a random access procedure;
or
monitor, in the search space, a monitoring occasion corresponding to the target reference object and the QCL reference object.

17. A non-transitory computer readable storage medium, storing a computer program that, when executed by a processor, causes the processor to:
obtain a quasi co-location (QCL) reference object that is quasi co-located with a target reference object, wherein each of the target reference object and the QCL reference object comprises a synchronization signal and PBCH block (SSB); and
determine an available random access resource based on a correspondence between a reference object group and a random access resource, wherein the reference object group comprises the target reference object and the QCL reference object,
wherein information about the correspondence between the reference object group and the random access resource comprises at least one of the following:
information about a quantity of random access resources corresponding to the reference object group;
preamble information that corresponds to the reference object group and is in the random access resource, wherein the preamble information is used to indicate at least one of a preamble used for contention-based random access, a preamble used for contention-free random access, a preamble used for a system information SI request, a preamble used for beam failure recovery BFR, or a preamble used for a specific group;
a power parameter of the random access resource; or
a measurement threshold for the reference object group.

* * * * *